United States Patent
Raghavan et al.

(10) Patent No.: US 11,729,809 B2
(45) Date of Patent: Aug. 15, 2023

(54) MITIGATING CROSS-LINK INTERFERENCE BETWEEN USER EQUIPMENT ACROSS MILLIMETER WAVE BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/143,012

(22) Filed: Jan. 6, 2021

(65) Prior Publication Data

US 2021/0274506 A1 Sep. 2, 2021

Related U.S. Application Data

(60) Provisional application No. 62/982,890, filed on Feb. 28, 2020.

(51) Int. Cl.
*H04W 72/541* (2023.01)
*H04W 76/15* (2018.01)
(Continued)

(52) U.S. Cl.
CPC .............. *H04W 72/541* (2023.01); *H04L 5/14* (2013.01); *H04L 41/0816* (2013.01);
(Continued)

(58) Field of Classification Search
CPC ........... H04W 72/082; H04W 72/0446; H04W 72/046; H04W 72/10; H04W 76/15;
(Continued)

(56) References Cited

U.S. PATENT DOCUMENTS

2019/0364449 A1* 11/2019 Yang ................. H04W 72/0446
2020/0288482 A1* 9/2020 Yl ......................... H04L 5/0064
(Continued)

FOREIGN PATENT DOCUMENTS

WO WO-2019160973 A1 * 8/2019

OTHER PUBLICATIONS

CATT: "Contents of the Group-Common PDCCH", 3GPP Draft, 3GPP TSG RAN WG1 Meeting #90, R1-1712397, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051315213, 6 Pages, Retrieved from the Internet: URL: http://www.3gpp.org/ftp/Meetings_3GPP_SYNC/ RAN1/Docs/. [retrieved on Aug. 20, 2017] figures 1, 2 sections 1-4.
(Continued)

*Primary Examiner* — Rina C Pancholi
(74) *Attorney, Agent, or Firm* — Seyfarth Shaw LLP

(57) ABSTRACT

Dynamic time division duplex (TDD) is a flexible transmission technique allowing different user equipments (UEs) to operate in a downlink mode or an uplink mode depending on the instantaneous traffic load. As a result, a UE transmitting on an uplink channel may interfere with a neighboring UE receiving on a downlink channel. UEs may coordinate communication parameters to reduce cross-link interference. A UE may determine a preferred value(s) for a first communication parameter comprising a beam direction or a slot format index (SFI). The UE receives a candidate value(s) for the first communication parameter, the candidate value(s) being based on communications between a second UE and a first base station. The UE selects a first value among the preferred values based on the received candidate value(s); and initiates communications with a
(Continued)

second base station using the first value for the first communication parameter.

30 Claims, 19 Drawing Sheets

(51) Int. Cl.
H04W 72/044 (2023.01)
H04L 41/0816 (2022.01)
H04W 72/0446 (2023.01)
H04L 5/14 (2006.01)
H04W 72/56 (2023.01)
H04W 88/06 (2009.01)

(52) U.S. Cl.
CPC ..... *H04W 72/046* (2013.01); *H04W 72/0446* (2013.01); *H04W 72/56* (2023.01); *H04W 76/15* (2018.02); *H04W 88/06* (2013.01)

(58) Field of Classification Search
CPC .... H04W 88/06; H04W 4/40–48; H04L 5/14; H04L 41/0816; H04L 5/001; H04L 5/0048; H04L 5/0051; H04L 27/0006; H04L 27/26025; H04L 5/0023; H04L 5/0053; H04L 5/0073; H04J 11/003

See application file for complete search history.

(56) References Cited

U.S. PATENT DOCUMENTS

| | | | |
|---|---|---|---|
| 2021/0051655 A1* | 2/2021 | Lee | H04W 72/0446 |
| 2021/0058914 A1* | 2/2021 | Chae | H04B 7/0695 |
| 2021/0084655 A1* | 3/2021 | Estevez | H04B 7/0408 |
| 2021/0258133 A1* | 8/2021 | Raghavan | H04J 11/0023 |

OTHER PUBLICATIONS

International Search Report and Written Opinion—PCT/US2021/012544—ISA/EPO—Apr. 22, 2021.
LG Electronics: "Discussion on Mechanism for NR RIM Support", 3GPP TSG RAN WG1 Meeting #94bis, R1-1810291, Oct. 12, 2018 (Dec. 10, 2018), pp. 1-11, XP051517705, Retrieved from the Internet: URL: http://vww.3gpp.org/ftp/tsg%5Fran/WG1%5FRL1/TSGR1%5F94b/Docs/R1%2D1810291%2Ezip. Sections 1-4, section 3.

* cited by examiner

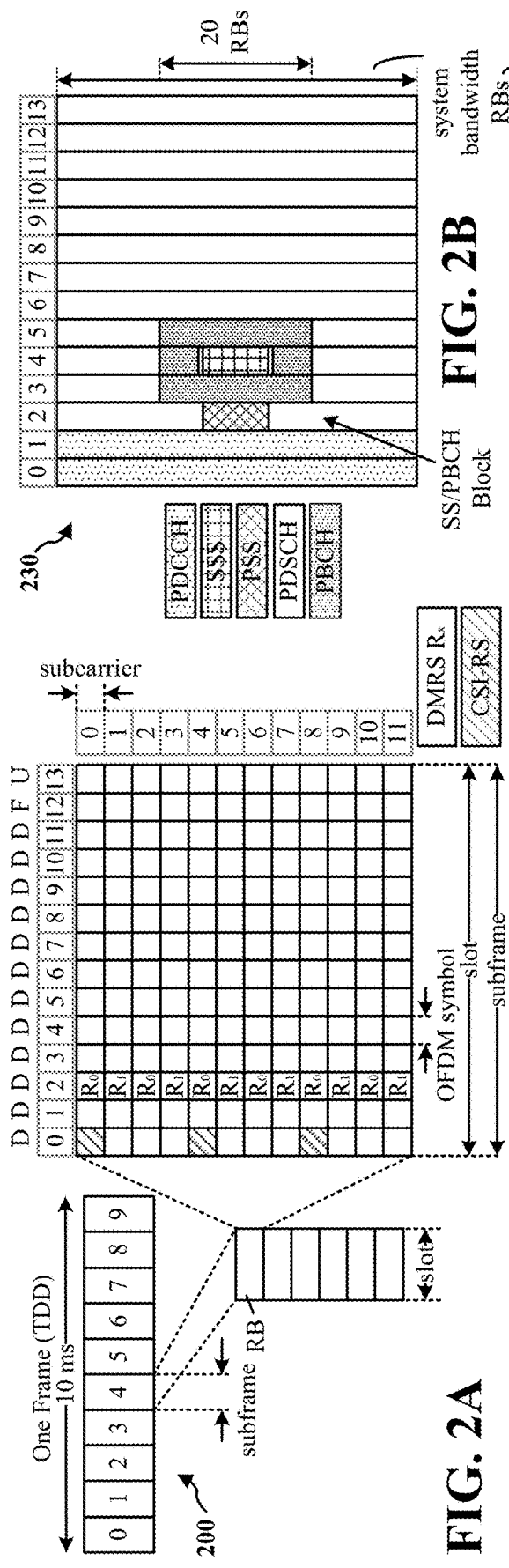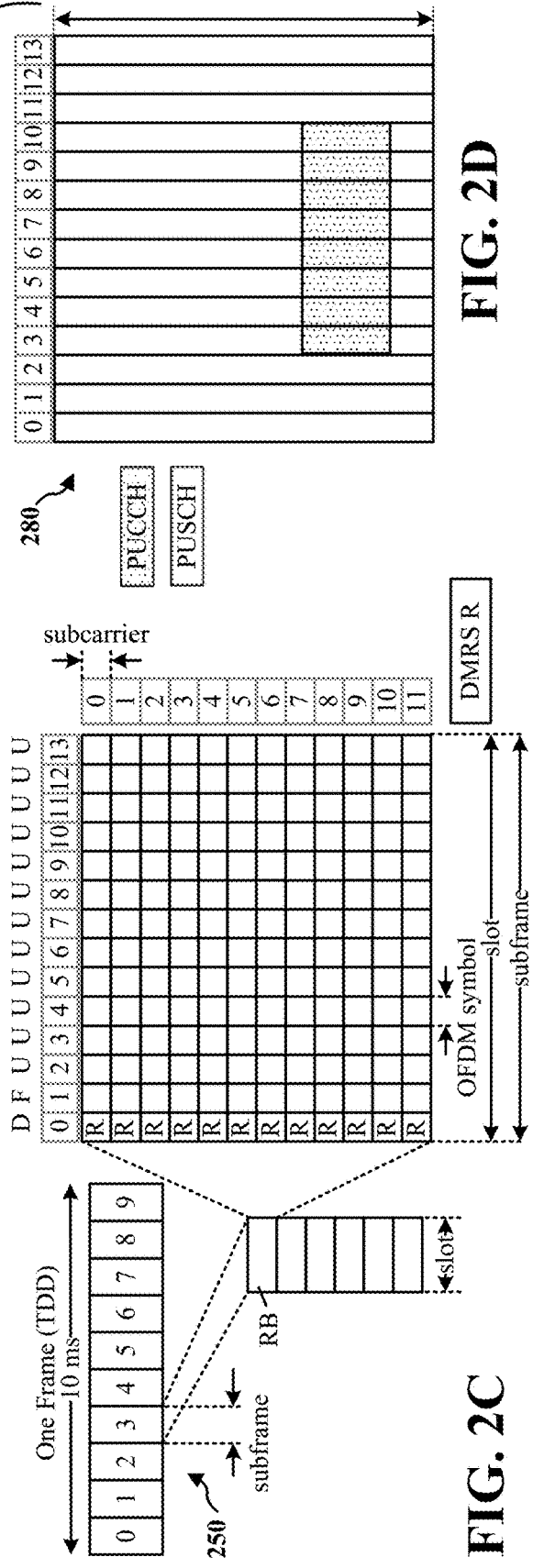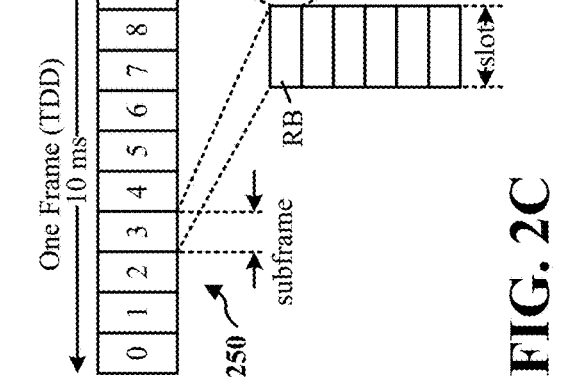

Symbol Index: 0 1 2 3 4 5 6 7 8 9 10 11 12 13

UE1 Slot Format (SFI=0): | D | D | D | D | D | D | D | D | D | D | D | D | D | D |

UE2 Slot Format (SFI=28): | D | D | D | D | D | D | D | D | D | D | D | D | F | U |

FIG. 5A

Symbol Index: 0 1 2 3 4 5 6 7 8 9 10 11 12 13

UE1 Slot Format (SFI=0): | D | D | D | D | D | D | D | D | D | D | D | D | D | D |

UE2 Slot Format (SFI=3): | D | D | D | D | D | D | D | D | D | D | D | D | D | F |

FIG. 5B

Symbol Index: 0 1 2 3 4 5 6 7 8 9 10 11 12 13

UE1 Slot Format (SFI=0): | D | D | D | D | D | D | D | D | D | D | D | D | D | D |

UE2 Slot Format (SFI=0): | D | D | D | D | D | D | D | D | D | D | D | D | D | D |

FIG. 5C

MITIGATING CROSS-LINK INTERFERENCE BETWEEN USER EQUIPMENT ACROSS MILLIMETER WAVE BANDS

CROSS-REFERENCE TO RELATED APPLICATION

The present application claims the benefit of U.S. Provisional Patent Application No. 62/982,890, filed on Feb. 28, 2020, and titled "MITIGATING CROSS-LINK INTERFERENCE BETWEEN USER EQUIPMENT ACROSS MILLIMETER WAVE BANDS," the disclosure of which is expressly incorporated by reference it its entirety.

BACKGROUND

Technical Field

The present disclosure relates generally to communication systems, and more particularly, to a mitigating cross-link interference between user equipment across millimeter wave bands.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Dynamic time division duplexing (TDD) is a flexible transmission technique in 5G NR that allows different user equipments (UEs) to dynamically operate in a downlink (DL) mode or an uplink (UL) mode depending on the instantaneous traffic load, channel conditions, and use-cases at the UEs. For example, the allocation of DL and UL resources (or symbols) may change on a per-subframe basis. In some instances, a UE transmitting on an UL channel may interfere with a neighboring UE receiving on a DL channel. This type of interference may be referred to as cross-link interference (CLI). Thus, there is a tradeoff between the flexibility of transmissions and CLI in 5G NR.

In some implementations, UEs may coordinate one or more communication parameters to reduce or eliminate CLI in inter-UE coexistence. Example communication parameters may include, but are not limited to, beam direction and slot format. By coordinating their communication parameters, each UE may select a combination of beam directions and slot formats that avoids, minimizes, or mitigates CLI with neighboring UEs. For example, if a first UE uses a beam direction that overlaps with a beam direction used by a second UE, and thus increases the interference due to beam overlap during a given time period (or symbol duration), the first and second UEs may select coordinated slot formats such that one UE is not configured for UL transmissions while the other UE is configured for DL transmissions during the given time period. On the other hand, if a first UE is configured for UL transmissions while a second UE is configured for DL transmissions during a given time period (or symbol duration), the first and second UEs may select coordinated beam directions that do not overlap with one another during the given time period.

In an aspect of the disclosure, a method, a computer-readable medium, and an apparatus are provided. The method, performed by a first base station, includes determining a value of a first communication parameter to be used for communications between a second base station and a first UE, selecting one or more candidate values for a second communication parameter based at least in part on the value of the first communication parameter, and transmitting, to a second UE, an indication of the one or more candidate values to be used for communications between the second UE and the first base station. The first and second communication parameters may indicate a beam direction or slot format index.

An example apparatus includes a memory and at least one processor. The processor is configured to cause the apparatus to determine a value of a first communication parameter to be used for communications between a base station and a first UE. The processor is also configured to cause the apparatus to select one or more candidate values for a second communication parameter based at least in part on the value of the first communication parameter. The processor is further configured to cause the apparatus to transmit, to a second UE, an indication of the one or more candidate values to be used for communications between the apparatus and the second UE. The first and second communication parameters may indicate a beam direction or slot format index.

An example non-transitory, computer-readable medium stores instructions that, when executed by a processor of a device, cause the device to perform operations including determining a value of a first communication parameter to be used for communications between a base station and a first UE, selecting one or more candidate values for a second communication parameter based at least in part on the value of the first communication parameter, and transmitting, to a second UE, an indication of the one or more candidate values to be used for communications between the device and the second UE. The first and second communication parameters may indicate a beam direction or slot format index.

An example apparatus includes means for determining a value of a first communication parameter to be used for communications between a base station and a first UE, selecting one or more candidate values for a second communication parameter based at least in part on the value of the first communication parameter, and transmitting, to a second UE, an indication of the one or more candidate values to be used for communications between the apparatus and the second UE. The first and second communication parameters may indicate a beam direction or slot format index.

In another aspect of the disclosure, a method, a computer-readable medium, and an apparatus are provided. The method, performed by a first UE, includes receiving one or more candidate values for a first communication parameter, where the one or more candidate values are based at least in part on communications between a second UE and a first base station, determining one or more preferred values for the first communication parameter, selecting a first value among the one or more preferred values based at least in part on the received candidate values, and initiating communications with a second base station using the first value for the first communication parameter. The first communication parameter may indicate a beam direction or slot format index.

An example apparatus includes a memory and at least one processor. The processor is configured to cause the apparatus to receive one or more candidate values for a first communication parameter, where the one or more candidate values are based at least in part on communications between a UE and a first base station, determine one or more preferred values for the first communication parameter, select a first value among the one or more, the one or more preferred values based at least in part on the received candidate values, and initiate communications with a second base station using the first value for the first communication parameter. The first communication parameter may indicate a beam direction or slot format index.

An example non-transitory, computer-readable medium stores instructions that, when executed by a processor of a device, cause the device to perform operations including receiving one or more candidate values for a first communication parameter, where the one or more candidate values are based at least in part on communications between a UE and a first base station, determining one or more preferred values for the first communication parameter, selecting a first value among the one or more preferred values based at least in part on the received candidate values, and initiating communications with a second base station using the first value for the first communication parameter. The first communication parameter may indicate a beam direction or slot format index.

An example apparatus includes means for receiving one or more candidate values for a first communication parameter, where the one or more candidate values are based at least in part on communications between a UE and a first base station, determining one or more preferred values for the first communication parameter, selecting a first value among the one or more preferred values based at least in part on the received candidate values, and initiating communications with a second base station using the first value for the first communication parameter. The first communication parameter may indicate a beam direction or slot format index.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 5A, 5B, and 5C are diagrams illustrating example slot format pairings usable for communications in wireless communication systems with inter-UE coexistence.

DETAILED DESCRIPTION

Figure 1:
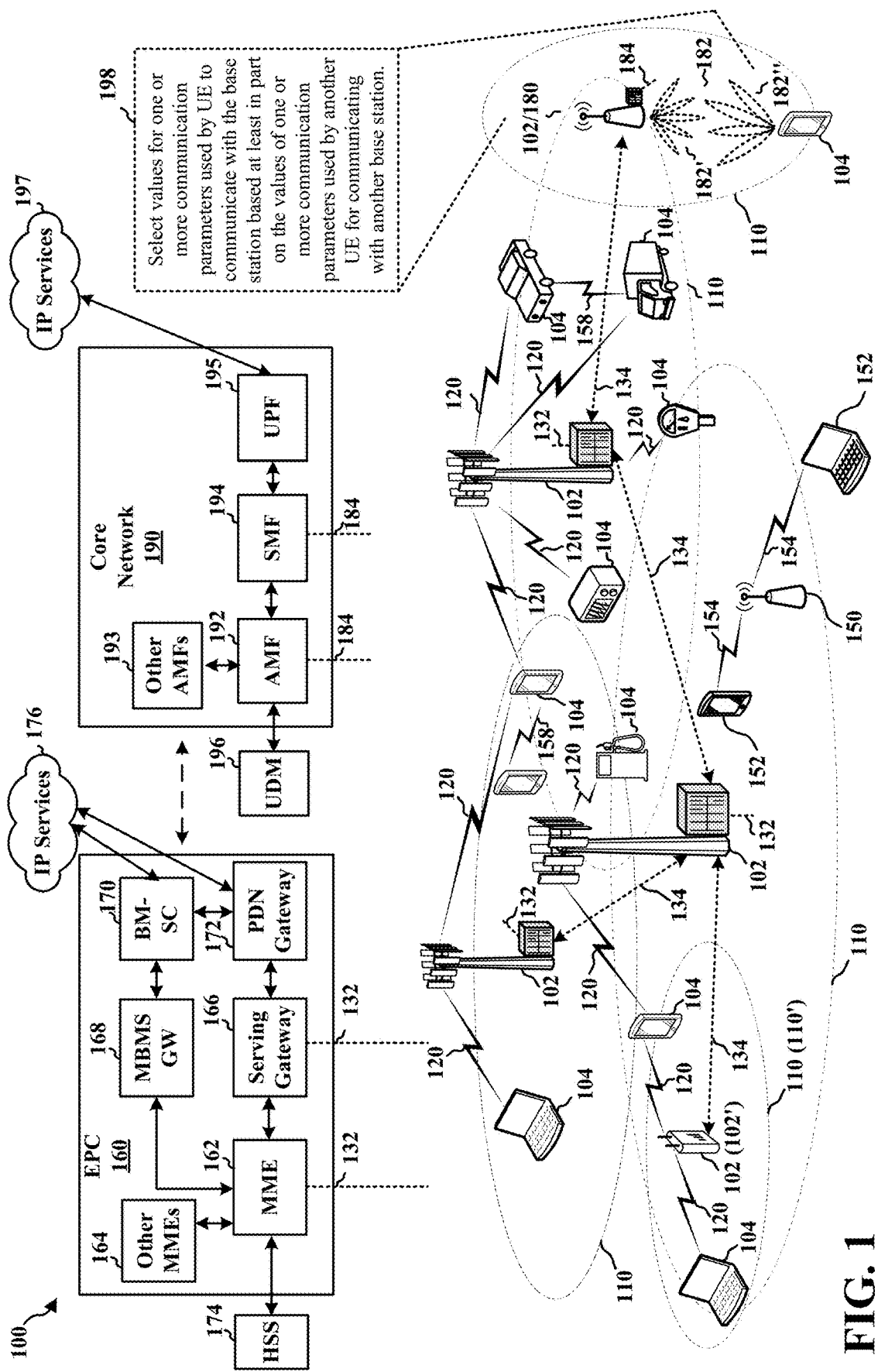
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), a router, a repeater, an integrated access backhaul (IAB) node or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Advancements in 5G NR include beamforming and utilization of the extremely high frequency (EHF) or millimeter wave (mmW) spectrum (30-300 GHz). In mmW communications, beamforming is highly directional to compensate for the extremely high path loss and short range. In other words, each beam may be narrowly focused in a given direction. UEs operating in the UL mode use transmit (TX) beamforming techniques to focus the energy of UL signals in the direction of a corresponding base station. UEs operating in the DL mode use receive (RX) beamforming techniques to tune their receive antennas in the direction of the beams transmitted by a corresponding base station. The focused beam greatly improves the signal-to-interference-plus-noise ratio (SINR) of communications between the transmitting device and the receiving device.

Dynamic time division duplex (TDD) is a flexible transmission technique in 5G NR that allows different UEs 104 to operate in a DL mode or a UL mode depending on the instantaneous traffic load. For example, DL and UL resources may be allocated for each UE 104 according to a particular slot format. The slot format specifies which symbols (in a given slot) are to be used for DL transmissions and which symbols are to be used for UL transmissions. The 3GPP standards describe several different slot formats (with different combinations of UL and DL symbol allocations) that can be dynamically implemented by a UE 104 on a per-frame basis. In some instances, a UE transmitting UL data may interfere with a neighboring UE concurrently receiving DL data. This type of interference may be referred to as cross-link interference (CLI).

Referring again to FIG. 1, in certain aspects, the UE 104 may be configured to select values for one or more communication parameters used to communicate with the base station 102 based at least in part on the values of one or more communication parameters used by another UE for communicating with another base station (198). Example communication parameters may include, but are not limited to, beam direction and slot format. In some implementations, the base station 102 may determine a value of a first communication parameter to be used for communications between the other base station and the other UE. The base station 102 may further select one or more candidate values for a second communication parameter based at least in part on the value of the first communication parameter and transmit, to the UE 104, an indication of the one or more candidate values. The UE 104 may then select one of the candidate values for the second communication parameter to be used for communications with the base station 102.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD), in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator. Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
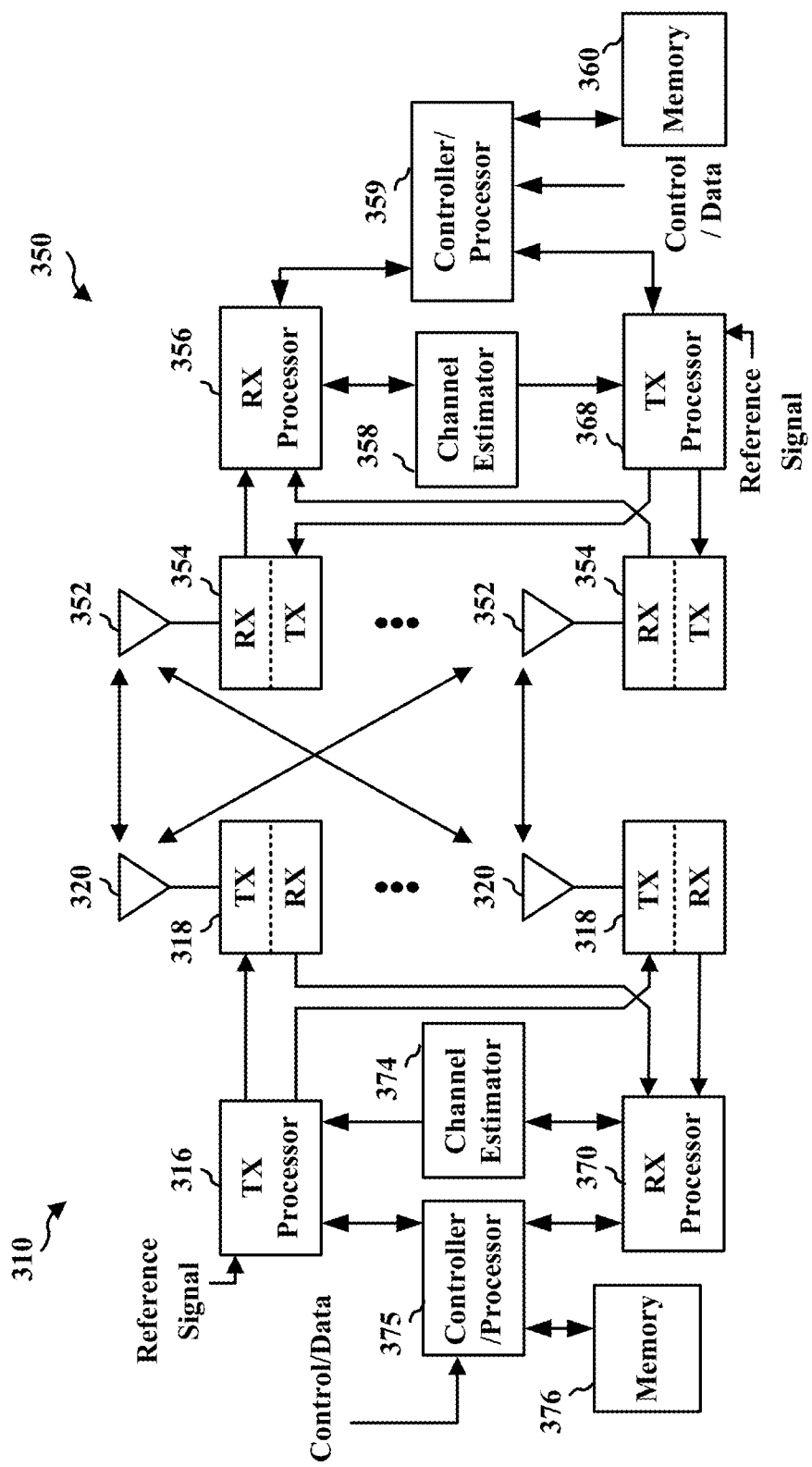
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described above, dynamic TDD is a flexible transmission technique allowing different UEs to operate in a DL mode or a UL mode depending on the instantaneous traffic load, channel conditions or use-cases. For example, DL and UL resources may be allocated for each UE according to a particular slot format (as described with reference to FIGS. 2A-2D). In some instances, a UE's transmission of UL data may create cross-link interference (CLI) with a neighboring UE's reception of DL data during the same time duration or symbol period. Thus, there is a tradeoff between the flexibility of transmissions and CLI.

Wireless communication devices conforming to legacy 3GPP standards (such as NR Rel-15 and NR Rel-16) may operate in frequency range two (FR2) (24.25-52.6 GHz). Additionally, wireless communication devices conforming to current and future 3GPP standards may operate in frequency range four (FR4) (52.6-71 GHz with possible extensions to 114.25 GHz). It is noted that frequency range four (FR4) also coincides with signaling frequencies used by other radio access technologies (such as defined by the IEEE 802.11 standards). Higher order harmonics of FR2 may interfere with transmissions in FR4. For example, the second harmonic of 28 GHz signals may interfere with 60 GHz signals. Thus, it may be desirable to mitigate CLI in FR2 and FR4 to improve UE coexistence.

Figure 4A:
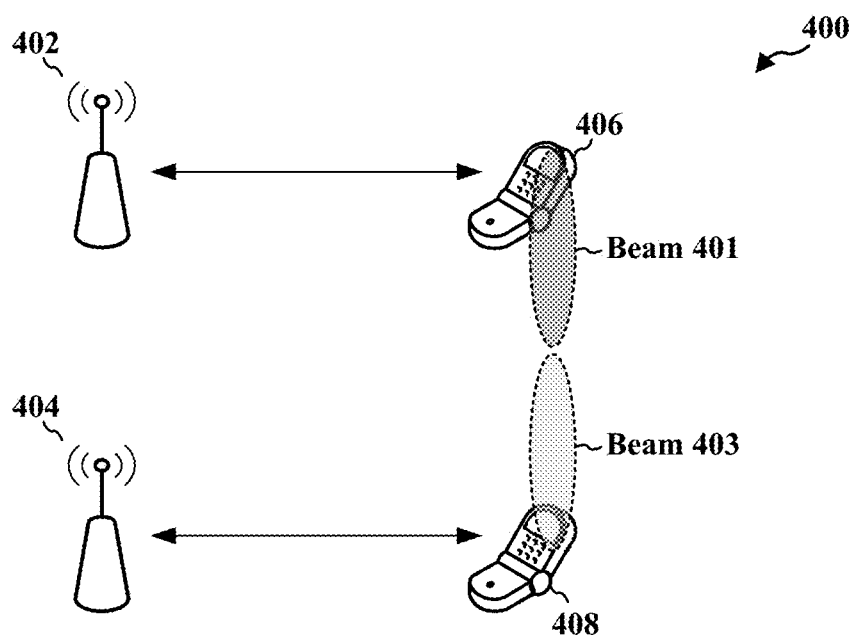
FIGS. 4A and 4B are diagrams illustrating example wireless communication systems with inter-UE coexistence.

FIG. 4A is a diagram illustrating an example of a wireless communication system 400 with inter-UE coexistence. The wireless communication system 400 includes base stations 402 and 404 and UEs 406 and 408. The wireless communication system 400 may be an example implementation of the wireless communication system 100 of FIG. 1. Thus, each of the base stations 402 and 404 may be an example implementation of any of the base stations 102/180, and each of the UEs 406 and 408 may be an example implementation of the UE 104. Although only two base stations 402 and 404 and two UEs 406 and 408 are shown in the example of FIG. 4A, the wireless communication system 400 may include any number of base stations and any number of UEs in actual implementations.

As shown in FIG. 4A, the first UE 406 may be configured to communicate with the first base station 402 and the second UE 408 may be configured to communicate with the second base station 404. More specifically, each of the UEs 406 and 408 may communicate with its respective base station 402 and 404 using beamforming. UEs operating in the UL mode use transmit (TX) beamforming techniques to focus the energy of UL signals in the direction of a corresponding base station. UEs operating in the DL mode use receive (RX) beamforming techniques to tune their receive antennas in the direction of the beams transmitted by a corresponding base station.

The first UE 406 may be configured to transmit UL signals to, or receive DL signals from, the first base station 402 by tuning its antennas in a first beam direction 401. For example, the first beam direction 401 may correspond to one or more antenna sectors (of a phased array antenna) of the first UE 406. The second UE 408 may be configured to transmit UL signals to, or receive DL signal from, the second base station 404 by tuning its antennas to a second beam direction 403. For example, the second beam direction 403 may correspond to one or more antenna sectors of the second UE 408.

In the example of FIG. 4A, the first beam direction 401 substantially overlaps with the second beam direction 403 such that concurrent DL and UL transmissions by the different UEs 406 and 408 may result in cross-link interference. For example, a transmission of DL data by the first UE 406 in the first beam direction 401 may interfere with a concurrent reception of UL data by the second UE 408 in the second beam direction 403. Similarly, a transmission of DL data by the second UE 408 in the second beam direction 403 may interfere with a concurrent reception of UL data by the first UE 406 in the first beam direction 401. Two or more beam directions may be determined to overlap if the CLI resulting from concurrent UL and DL transmissions exceeds an interference threshold (such as a threshold signal to interference plus noise ratio (SINR)).

In some implementations, the UEs 406 or 408 may be configured to coordinate their beam selections to avoid using overlapping beam directions when communicating in different directions (where one UE transmits UL data while the other UE concurrently receives DL data). For example, aspects of the present disclosure recognize that wireless signals may traverse multiple paths between a UE and a base station. Thus, there may be multiple suitable beam directions by which a UE may transmit UL data or receive DL data (depending on channel conditions). In some aspects, one (or both) of the UEs 406 or 408 may select a beam direction that does not overlap a beam direction of the other UE when communicating in a direction (UL or DL) different than that of the other UE. Two or more beam directions may be determined to not overlap if the CLI resulting from concurrent UL and DL transmissions is equal to or below an interference threshold (such as a threshold SINR).

Figure 4B:
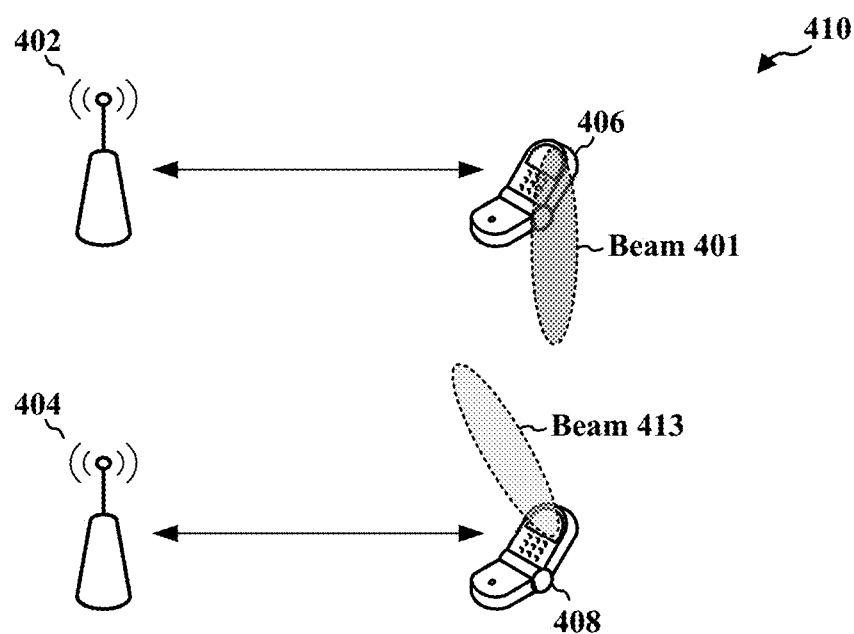

FIG. 4B is a diagram illustrating another example wireless communication system 410 with inter-UE coexistence. In the example of FIG. 4B, the second UE 408 may select a third beam direction 413 (for UL or DL communications) that does not overlap the first beam direction of the first UE 406. More specifically, the second UE 408 may use the third beam direction 413 to transmit UL data when the first UE 406 receives DL data in the first beam direction 401. The second UE 408 also may use the third beam direction 413 to receive DL data when the first UE 408 transmits UL data in the first beam direction 401. Because the first beam direction 401 does not overlap the third beam direction 413, cross-link interference is substantially mitigated or avoided in the wireless communication system 410.

Aspects of the present disclosure further recognize that, depending on the channel conditions, it may not be feasible for the UEs 406 and 408 to select non-overlapping beam directions to be used to communicate with their respective base stations 402 and 404. Thus, in some other implementations, the UEs 406 and 408 may coordinate their slot format selections to avoid using slot formats where one UE transmits UL data while the other UE concurrently receives DL data in overlapping beam directions. With reference for example to the wireless system 400 depicted in FIG. 4A, the UEs 406 and 408 may select respective slot formats that ensure the first UE 406 does not transmit UL data in the first beam direction 401 while the second UE 408 receives DL data in the second beam direction 403.

FIG. 5A is a diagram illustrating an example slot format pairing 500 usable for communications in wireless communication systems with inter-UE coexistence. More specifically, FIG. 5A shows a single slot duration, consisting of 14 symbol periods (symbol indices 0-13), associated with two coexisting user equipment UE1 and UE2. With reference for example to FIG. 4A, UE1 and UE2 may correspond to UEs 406 and 408, respectively. More specifically, each of the user equipment UE1 and UE2 may be an example implementation of the UE 104 of FIG. 1.

As shown in FIG. 5A, UE1 implements a slot format indicator (SFI) consistent with SFI=0 (as determined by 3GPP TR 38.211 and 38.213) while UE2 implements a slot format consistent with SFI=28 for the same slot duration. In accordance with SFI=0, UE1 is assigned downlink symbols ("D") in each of the symbol indices 0-13 of a subframe. In accordance with SFI=28, UE2 is assigned downlink symbols in each of the symbol indices 0-11, a flexible symbol ("F") in symbol index 12, and an uplink symbol ("U") in symbol index 13. The flexible symbol may be used for uplink, downlink, or as a gap symbol to aid in downlink-uplink or uplink-downlink transition. Because the flexible symbol can be used for DL or UL communications, CLI can be avoided in symbol index 12 by configuring UE2 to receive DL data while UE1 is also concurrently configured to receive DL data.

Because UE1 is configured to receive DL data while UE2 is configured to transmit UL data, in symbol index 13, CLI may result if UE1 and UE2 use overlapping beam directions for the transmission and reception of data during this symbol period (such as shown in FIG. 4A). To avoid or mitigate CLI, UE1 and UE2 may select non-overlapping beam directions to be used during symbol periods in which one UE is configured to transmit UL data and the other UE is concurrently configured to receive DL data. With reference for example to FIG. 4B, UE1 may select the first beam direction 401 and UE2 may select the third beam direction 413 for the reception of DL data and the transmission of UL data in symbol index 13.

As used in this description, a communication mode (representative of an uplink symbol, a downlink symbol, or a flexible symbol) of UE1 may be deemed "consistent" with a communication mode of UE2 if the corresponding symbols can be used for communications in the same direction. With reference for example to FIG. 5A, the communication modes of UE1 and UE2 are consistent in symbol index 11 because UE1 and UE2 are both configured to receive DL data and in symbol index 12 because UE1 is configured to receive DL data and UE2 can be configured to receive DL data. The communication modes are not consistent in symbol index 13 because UE1 is configured to receive DL data but UE2 cannot be configured to receive DL data.

FIG. 5B is a diagram illustrating another example slot format pairing 510 usable for communications in wireless communication systems with inter-UE coexistence. As shown in FIG. 5B, UE1 implements a slot format consistent with SFI=0 while UE2 implements a slot format consistent with SFI=3 for the same slot duration. In accordance with SFI=0, UE1 is assigned downlink symbols in each of the symbol indices 0-13. In accordance with SFI=3, UE2 is assigned downlink symbols in each of symbol indices 0-12 and a flexible symbol in symbol index 13.

Because the flexible symbol can be used for DL or UL communications, CLI can be avoided in symbol index 13 by configuring UE2 to receive DL data while UE1 is also concurrently configured to receive DL data. Alternatively, UE2 may use the flexible symbol as a gap symbol. Thus, UE1 and UE2 may use any beam directions (including overlapping and non-overlapping beam directions) to receive DL data in any of the symbol indices 0-13 for the slot format pairing 510. For example, UE1 may use the first beam direction 401 and UE2 may use the second beam direction 403 for the reception of DL data in any of the symbol indices 0-13. Additionally, or alternatively, UE2 may use the third beam direction 413 for the reception of DL data in any of the symbol indices 0-13.

FIG. 5C is a diagram illustrating another example slot format pairing 520 usable for communications in wireless communication systems with inter-UE coexistence. As shown in FIG. 5C, UE1 implements a slot format consistent with SFI=0 while UE2 also implements a slot format consistent with SFI=0 for the same slot duration. In accordance with SFI=0, each of the user equipments UE1 and UE2 is assigned downlink symbols in each of the symbol indices 0-13.

Because the symbols of UE2 are aligned with the symbols of UE1 in each of the symbol indices 0-13 (such that each symbol is a DL symbol), CLI is avoided in the slot format pairing 520. Thus, UE1 and UE2 may use any beam directions (including overlapping and non-overlapping beam directions) to receive DL data in any of the symbol indices 0-13 for the slot format pairing 520. For example, UE1 may use the first beam direction 401 and UE2 may use the second beam direction 403 for the reception of DL data in any of the symbol indices 0-13. Additionally, or alternatively, UE2 may use the third beam direction 413 for the reception of DL data in any of the symbol indices 0-13.

As described above, UE1 and UE2 may coordinate their selection of one or more communication parameters (such as beam direction or slot format index) to avoid or mitigate CLI in inter-UE coexistence. In other words, UE1 may select a particular beam direction or slot format based, at least in part, on one or more beam directions or slot formats preferred by UE2. Similarly, UE2 may select a particular beam direction or slot format based, at least in part, on one or more beam directions or slot formats preferred by UE1. In the examples above, if UE1 prefers the first beam direction 401 and the slot format consistent with SFI=0, UE2 may select the third beam direction 413 or a slot format consistent with SFI=3 or 0.

It is noted that FIGS. 4A and 4B show only a limited sample of all possible beam directions and FIGS. 5A-5C show only a limited sample of possible slot format pairings between UE1 and UE2. In actual implementations, each UE may have multiple preferred beam directions or slot formats that may be suitable for communications with its respective base station at any given time. Thus, each UE may require a mechanism for communicating its preferences to one or more neighboring UEs (in inter-UE coexistence). In some implementations, two or more base stations may help coordinate the selection of one or more communication parameters between their UEs.

Figure 6:
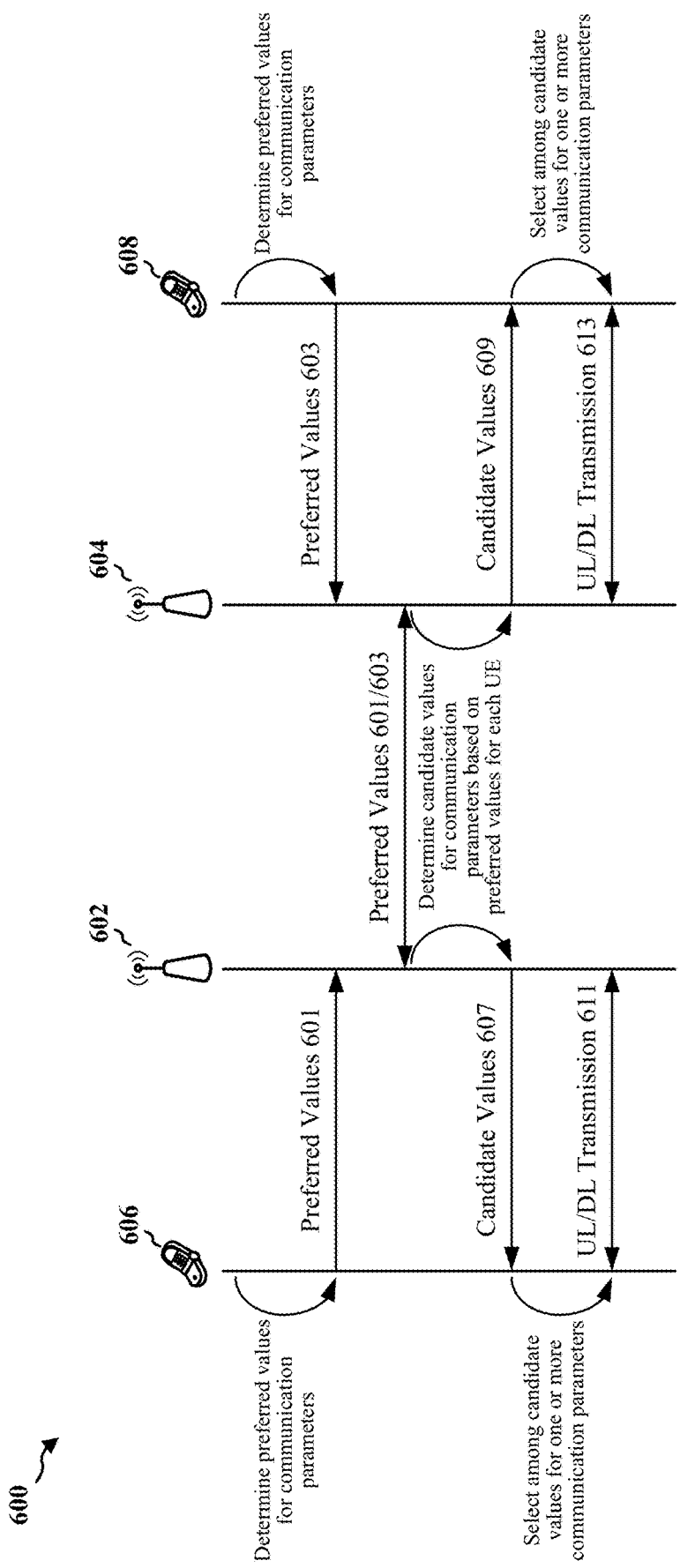
FIG. 6 is a diagram illustrating an example message exchange between UEs and coordinated base stations.

FIG. 6 is a diagram illustrating an example message exchange 600 between UEs 606 and 608 and coordinated base stations 602 and 604. Each of the base stations 602 and 604 may be one example of the base station 102 of FIG. 1 or any of the base stations 402 or 404 of FIGS. 4A and 4B. Each of the UEs 606 and 608 may be one example of the UE 104 of FIG. 1 or any of the UEs 406 or 408 of FIGS. 4A and 4B. The access network may be a 5G NR access network.

The first UE 606 determines one or more preferred values for one or more of its communication parameters and transmits an indication of its preferred values 601 to the first base station 602. For example, the preferred values may include one or more beam directions or slot formats that are suitable for communications between the first UE 606 and the first base station 602. In some aspects, the first UE 606 may indicate the preferred values 601 in one or more RRC or UCI messages transmitted to the first base station 602. In some aspects, the indication may include a listing of only the preferred values for the first UE 606. In some other aspects, the indication may include a listing of values other than the preferred values for the first UE 606 (depending on which listing is shorter).

The second UE 608 also determines one or more preferred values for one or more of its communication parameters and transmits an indication of its preferred values 603 to the second base station 604. For example, the preferred values may include one or more beam directions or slot formats that are suitable for communications between the second UE 608 and the second base station 604. In some aspects, the second UE 608 may indicate the preferred values 603 in one or more RRC or UCI messages transmitted to the second base station 604. In some aspects, the indication may include a listing of only the preferred values for the second UE 608. In some other aspects, the indication may include a listing of values other than the preferred values for the second UE 608 (depending on which listing is shorter).

The base stations 602 and 604 may exchange the preferred values 601 and 603 of their respective UEs 606 and 608 via one or more backhaul links. For example, the first base station 602 may receive the preferred values 603 of the second UE 608 from the second base station 604. Similarly, the second base station 604 may receive the preferred values 601 of the first UE 606 from the first base station 602.

The base stations 602 and 604 may each determine one or more candidate values for the communication parameters based on the preferred values 601 and 603 for each of the UEs 606 and 608, respectively. More specifically, the first base station 602 may determine one or more candidate values for the first UE 606 based, at least in part, on the preferred values 603 for the second UE 608. Similarly, the second base station 604 may determine one or more candidate values for the second UE 608 based, at least in part, on the preferred values 601 for the first UE 606. In determining the candidate values, each of the base stations 602 and 604 may attempt to avoid or mitigate CLI, for example, by coordinating the beam directions or slot formats of the UEs 606 and 608.

In some implementations, the base stations 602 and 604 may first attempt to coordinate beam directions between the UEs 606 and 608. For example, each base station 602 and 604 may determine (for each symbol period) whether a preferred beam direction of the first UE 606 can be paired with a preferred beam direction of the second UE 608 such that the beams do not overlap. If the base stations 602 and 604 are successful in selecting coordinated (or non-overlapping) beam directions, the base stations 602 and 604 may permit the UEs 606 and 608 to use any of their preferred slot formats for the given slot. Accordingly, the candidate values for the first UE 606 may include the selected beam directions for the first UE 606 as well as the preferred slot formats indicated by the first UE 606. Similarly, the candidate values for the second UE 608 may include the selected beam directions for the second UE 608 as well as the preferred slot formats indicated by the second UE 608.

If the preferred beam directions for the first UE 606 cannot be coordinated with the preferred beam directions for the second UE 608 in a manner that avoids or mitigates CLI, the base stations 602 and 604 may further attempt to coordinate slot formats between the UEs 606 and 608. For example, the base stations 602 and 604 may select one or more slot formats for each of the UEs 606 and 608 (among the preferred slot formats indicated by the UEs 606 and 608) in which the communication mode of the first UE 606 is consistent with the communication mode of the second UE 608 in each symbol period of the given slot. Accordingly, the candidate values for the first UE 606 may include the selected slot formats for the first UE 606 as well as the preferred beam directions indicated by the first UE 606. Similarly, the candidate values for the second UE 608 may include the selected slot formats for the second UE 608 as well as the preferred beam directions indicated by the second UE 608.

In some other implementations, the base stations 602 and 604 may first attempt to coordinate slot formats between the UEs 606 and 608. For example, each base station 602 and 604 may determine whether a preferred slot format of the first UE 606 can be paired with a preferred slot format of the second UE 608 such that the communication mode of the first UE 606 is consistent with the communication mode of the second UE 608 in each symbol period of the given slot. If the base stations 602 and 604 are successful in selecting coordinated slot formats, the base stations 602 and 604 may permit the UEs 606 and 608 to use any of their preferred beam directions for the given slot. Accordingly, the candidate values for the first UE 606 may include the selected slot formats for the first UE 606 as well as the preferred beam directions indicated by the first UE 606. Similarly, the candidate values for the second UE 608 may include the selected slot formats for the second UE 608 as well as the preferred beam directions indicated by the second UE 608.

If the preferred slot formats for the first UE 606 cannot be coordinated with the preferred slot formats for the second UE 608 in a manner that avoids or mitigates CLI, the base stations 602 and 604 may further attempt to coordinate beam directions between the UEs 606 and 608. For example, the base stations 602 and 604 may select one or more beam directions for each of the UEs 606 and 608 (among the preferred beam directions indicated by the UEs 606 and 608) that do not overlap with one another. In some implementations, the beam selection may be optimized based on at least one of a resulting channel structure, data rate, diversity, power consumption, or heat dissipation. Accordingly, the candidate values for the first UE 606 may include the selected beam directions for the first UE 606 as well as the preferred slot formats indicated by the first UE 606. Similarly, the candidate values for the second UE 608 may include the selected beam directions for the second UE 608 as well as the preferred slot formats indicated by the second UE 608.

After determining the candidate values for the one or more communication parameters, the base stations 602 and 604 may transmit indications of the candidate values 607 and 609 to the UEs 606 and 608, respectively. For example, the first base station 602 may indicate the preferred values 607 in one or more RRC or DCI messages transmitted to the first UE 606. Similarly, the second base station 604 may indicate the preferred values 609 in one or more RRC or DCI messages transmitted to the second UE 608. In some aspects, the indication may include a listing of only the candidate values for the corresponding UE. In some other aspects, the indication may include a listing of values other than the candidate values for the corresponding UE (depending on which listing is shorter).

The first UE 606 selects one of the candidate values 607 for each of the communication parameters to be used for subsequent communications with the first base station 602. For example, the first UE 606 may select a particular slot format and beam direction (for each symbol period in the slot format) to be implemented for a given slot. The first UE 606 may then use the selected values to perform UL and/or DL transmissions 611 with the first base station 602.

The second UE 608 selects one of the candidate values 609 for each of the communication parameters to be used for subsequent communications with the second base station 604. For example, the second UE 608 may select a particular slot format and beam direction (for each symbol period in the slot format) to be implemented for a given slot. The second UE 608 may then use the selected values to perform UL and/or DL transmissions 613 with the second base station 604.

The implementations described with respect to FIG. 6 specify coordination (or communication) between the base stations 602 and 604. However, in some scenarios, the base stations associated with neighboring UEs may be uncoordinated. Such may be the case where one base station operates in a licensed spectrum (such as frequency range two (FR2)) while the other base station operates in an unlicensed spectrum (such as frequency range four (FR4)). Thus, in some implementations, the UEs may directly coordinate with one another to select one or more values for their communication parameters. In some other implementations, the base stations may provide one or more pre-coordinated values to their respective UEs.

Figure 7:
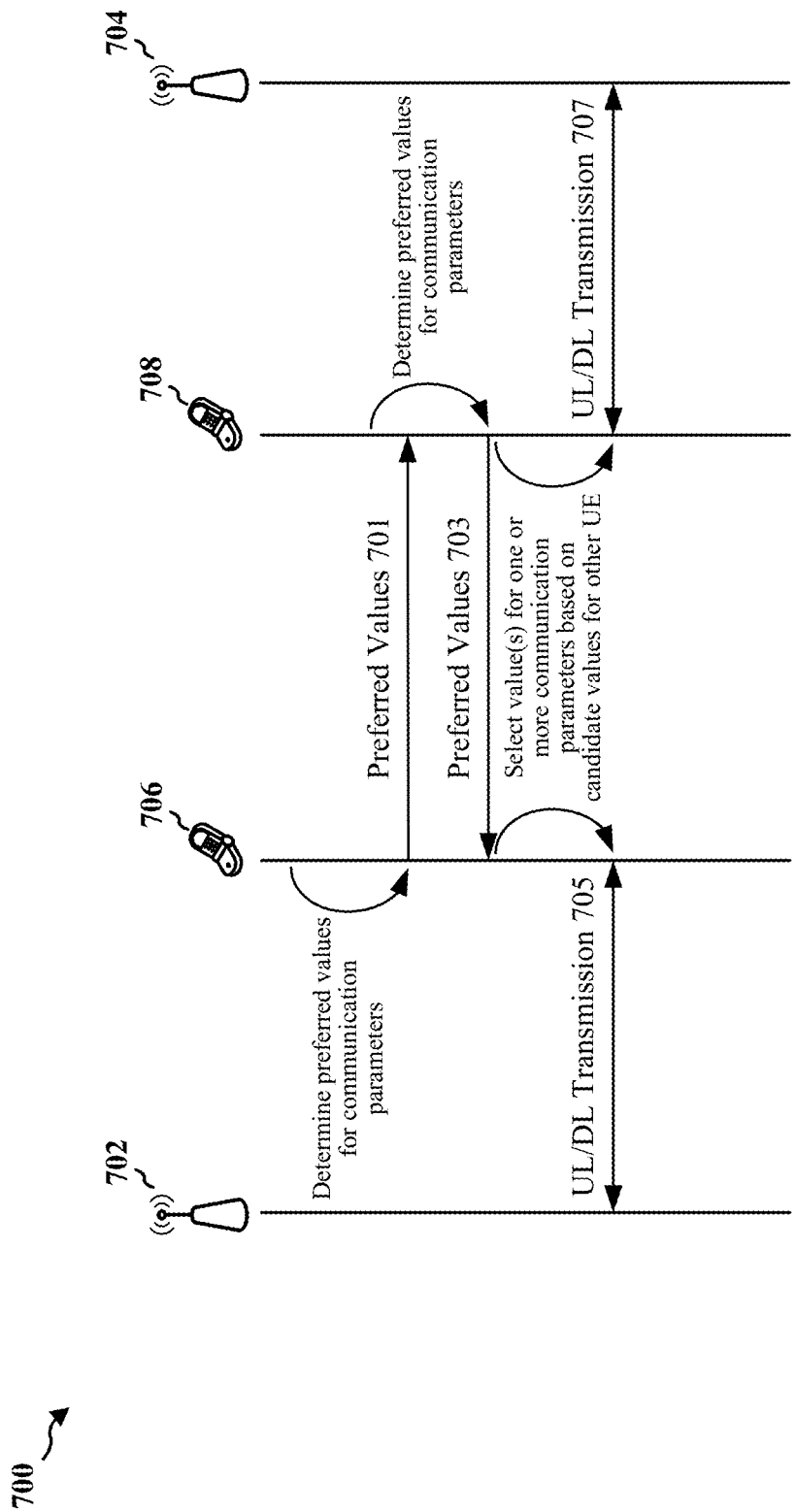
FIG. 7 is a diagram illustrating an example message exchange between UEs and uncoordinated base stations.

FIG. 7 is a diagram illustrating an example message exchange 700 between UEs 706 and 708 and uncoordinated base stations 702 and 704. Each of the base stations 702 and 704 may be one example of the base station 102 of FIG. 1 or any of the base stations 402 or 404 of FIGS. 4A and 4B. Each of the UEs 706 and 708 may be one example of the UE 104 of FIG. 1 or any of the UEs 406 or 408 of FIGS. 4A and 4B. The access network may be a 5G NR access network.

The first UE 706 determines one or more preferred values for one or more of its communication parameters and transmits an indication of its preferred values 701 to the second UE 708. For example, the preferred values may include one or more beam directions or slot formats that are suitable for communications between the first UE 706 and the first base station 702. In some aspects, the first UE 706 may indicate its preferred values 701 to the second UE 708 via one or more sidelink channels, for example, using sidelink control information (SCI) or discovery messages. In some aspects, the indication may include a listing of only the preferred values for the first UE 706. In some other aspects, the indication may include a listing of values other than the preferred values for the first UE 706 (depending on which listing is shorter).

The second UE 708 determines one or more preferred values for one or more of its communication parameters and transmits an indication of its preferred values 703 to the first UE 706. For example, the preferred values may include one or more beam directions or slot formats that are suitable for communications between the second UE 708 and the second base station 704. In some aspects, the second UE 708 may indicate its preferred values 703 to the first UE 706 via one or more sidelink channels, for example, using one or more SCI or discovery messages. In some aspects, the indication may include a listing of only the preferred values for the second UE 708. In some other aspects, the indication may include a listing of values other than the preferred values for the second UE 708 (depending on which listing is shorter).

The first UE 706 selects a value for each of the communication parameters to be used for subsequent communications with the first base station 702 based, at least in part, on the preferred values 703 of the second UE 708. For example, the first UE 706 may select a particular slot format and beam direction (among its preferred slot formats and preferred beam directions) to be implemented for a given slot. In selecting the slot format and beam direction, the first UE 706 may coordinate its preferred values with the preferred values of the second UE 708 (such as described above with respect to FIG. 6). In some aspects, the first UE 706 may determine which of its preferred beam directions can be paired with the preferred beam directions of the second UE 708 such that the beams do not overlap. In some other aspects, the first UE 706 may determine which of its preferred slot formats can be paired with the preferred slot formats of the second UE 708 such that the communication mode of the first UE 706 is consistent with the communication mode of the second UE 708 in each symbol period of the given slot. The first UE 706 may then use the selected values to perform UL and/or DL transmissions 705 with the first base station 702.

The second UE 708 selects a value for each of the communication parameters to be used for subsequent communications with the second base station 704 based, at least in part, on the preferred values 701 of the first UE 706. For example, the second UE 708 may select a particular slot format and beam direction (among its preferred slot formats and preferred beam directions) to be implemented for a given slot. In selecting the slot format and beam direction, the second UE 708 may coordinate its preferred values with the preferred values of the first UE 706 (such as described above with respect to FIG. 6). In some aspects, the second UE 708 may determine which of its preferred beam directions can be paired with the preferred beam directions of the first UE 706 such that the beams do not overlap. In some other aspects, the second UE 708 may determine which of its preferred slot formats can be paired with the preferred slot formats of the first UE 706 such that the communication mode of the first UE 706 is consistent with the communication mode of the second UE 708 in each symbol period of the given slot. The second UE 708 may then use the selected values to perform UL and/or DL transmissions 707 with the second base station 704.

Figure 8:
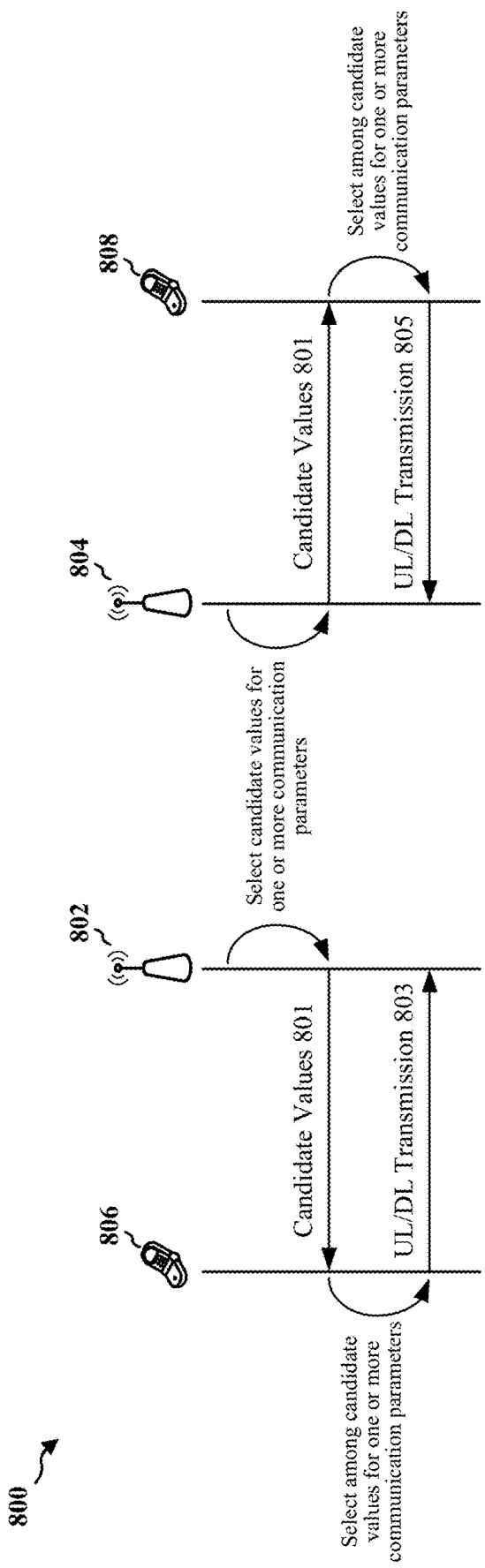
FIG. 8 is a diagram illustrating an example message exchange between UEs and uncoordinated base stations.

FIG. 8 is a diagram illustrating an example message exchange 800 between UEs 806 and 808 and uncoordinated base stations 802 and 804. Each of the base stations 802 and 804 may be one example of the base station 102 of FIG. 1 or any of the base stations 402 or 404 of FIGS. 4A and 4B. Each of the UEs 806 and 808 may be one example of the UE 104 of FIG. 1 or any of the UEs 406 or 408 of FIGS. 4A and 4B. The access network may be a 5G NR access network.

The base stations 802 and 804 may select one or more candidate values for one or more communication parameters to be used for communications with the UEs 806 and 808, respectively. In some implementations, the candidate values may include a limited number of slot formats that have been pre-coordinated (or predetermined) to avoid or minimize CLI. In other words, each of the UEs 806 and 808 may use any of the candidate values to communicate with the respective base stations 802 and 804 without suffering from CLI. An example subset of such candidate values may include SFI=0 and SFI=3 (as shown in FIG. 5B).

The base stations 802 and 804 may transmit indications of the candidate values 801 to the UEs 806 and 808, respectively. For example, the first base station 802 may indicate the candidate values 801 in one or more RRC or DCI messages transmitted to the first UE 806. Similarly, the second base station 804 may indicate the candidate values 801 in one or more RRC or DCI messages transmitted to the second UE 808. In some aspects, the indication may include a listing of only the candidate values. In some other aspects, the indication may include a listing of values other than the candidate values (depending on which listing is shorter).

The first UE 806 selects one of the candidate values 801 for each of the communication parameters to be used for subsequent communications with the first base station 802. For example, the first UE 806 may select a particular slot format and beam direction (for each symbol period in the slot format) to be implemented for a given slot. The first UE 806 may then use the selected values to perform UL or DL transmissions 803 with the first base station 802.

The second UE 808 also selects one of the candidate values 801 for each of the communication parameters to be used for subsequent communications with the second base station 804. For example, the second UE 808 may select a particular slot format and beam direction (for each symbol period in the slot format) to be implemented for a given slot. The second UE 808 may then use the selected values to perform UL and/or DL transmissions 805 with the second base station 804.

As described above, inter-UE coexistence may occur between multiple frequency ranges (such as FR2 and FR4). However, different subcarrier spacing (SCS) may be used for different frequency ranges. For example, slot formats associated with higher frequency ranges (such as FR4) may use shorter SCS than slot formats associated with lower frequency ranges (such as FR2). As a result, each symbol period of the lower frequency range may coincide with multiple symbol periods of the higher frequency range. Thus, in some implementations, neighboring UEs may coordinate their respective slot formats based, at least in part, on the SCS associated with each slot format.

Figure 9:
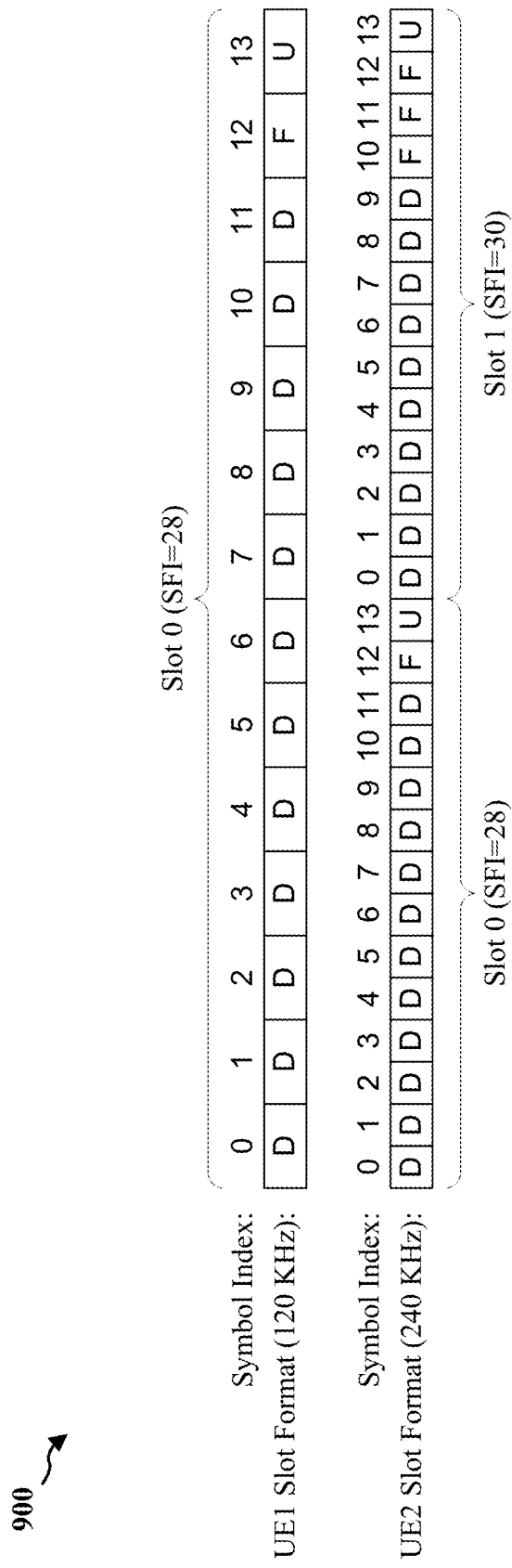
FIG. 9 is a diagram illustrating an example slot format pairing between UEs implementing different subcarrier spacing.

FIG. 9 is a diagram illustrating an example slot format pairing 900 between user equipment UE1 and UE2 implementing different SCSs. More specifically, FIG. 9 shows a single slot duration (consisting of 14 symbols) for UE1 which coincides with two slot durations (each consisting of 14 symbols) for UE2. With reference for example to FIG. 4A, UE1 and UE2 may correspond to UEs 406 and 408, respectively. More specifically, each of the user equipments UE1 and UE2 may be an example implementation of the UE 104 of FIG. 1.

As shown in FIG. 9, UE1 implements a single slot format (for slot 0) consistent with SFI=28 while UE2 implements two different slot formats (for slots 0 and 1) consistent with SFI=28, and 30. In accordance with SFI=28, UE1 is assigned downlink symbols in each of symbol indices 0-11, a flexible symbol in symbol index 12, and an uplink symbol in symbol index 13. In accordance with SFI=28, UE2 is also assigned downlink symbols in each of symbol indices 0-11, a flexible symbol in symbol index 12, and an uplink symbol in symbol index 13. In accordance with SFI=30, UE2 is further assigned downlink symbols in each of symbol indices 0-9, flexible symbols in symbol indices 10-12, and an uplink symbol in symbol index 13.

In the example of FIG. 9, UE1 uses a SCS of 120 KHz whereas UE2 uses a SCS of 240 KHz. As a result, each symbol index of UE1 coincides with (or overlaps) two symbol indices of UE2. For example, the downlink symbol in symbol index 6 of UE1 coincides with a flexible symbol (symbol index 12) and an uplink symbol (symbol index 13) of UE2. Because the flexible symbol can be used for DL or UL communications, CLI can be avoided in symbol index 12 (of UE2) by configuring UE2 to receive DL data. Alternatively, UE2 may use the flexible symbol as a gap symbol. However, to avoid or mitigate CLI in symbol index 13 (of UE2), the UEs may need to select non-overlapping beam directions for the transmission of UL data and the concurrent reception of DL data.

Thus, when coordinating communication parameters between UE1 and UE2, the UEs may need to consider multiple opportunities for CLI for each symbol of UE1. In some implementations, UE1 and UE2 may determine what SCS to use based at least in part on an amount of CLI between the UEs. For example, the CLI may be determined based on interference measurements performed by one or more base stations or reports by the UEs. When the CLI is sufficiently high, it may be desirable to reduce the difference in SCS between UE1 and UE2, for example, to reduce the number of opportunities for CLI.

In some other implementations, UE1 and UE2 may coordinate their slot formats such that each slot of the lower SCS (240 KHz) is aligned with a corresponding portion of the slot for the higher SCS (120 KHz). More specifically, at least one of the UEs may select a different slot format for slot 0 such that the communication mode in symbol index 6 of UE1 is consistent with the communication modes in symbol indices 12 and 13 for slot 0 of UE2. For example, UE1 may replace the downlink symbol in symbol index 6 with an uplink symbol or a flexible symbol. Alternatively, UE2 may replace the uplink symbol in symbol index 13 with a downlink symbol or a flexible symbol.

In some instances, both UEs may select slot formats containing one or more flexible symbols. With reference for example to FIG. 9, the flexible symbol in symbol index 12 of UE1 coincides with flexible symbols in symbol indices 10 and 11 of UE2. In some implementations, the flexible symbols of a lower-priority UE may be aligned with the flexible symbols of a higher-priority UE. More specifically, each UE may indicate its respective priority (using an SFI priority indication bit or field) during the process of coordinating one or more communication parameters. For example, each UE may provide its SFI priority indication to its respective base station or directly to the other UE along with its preferred values for one or more communication parameters.

For example, if UE1 has a higher priority than UE2, UE2 may configure one or both of its flexible symbols in symbol indices 10 and 11 to match the communication mode of the flexible symbol in symbol index 12 of UE1. Alternatively, UE2 may configure one or both of the flexible symbols as gap symbols. On the hand, if UE2 has a higher priority than UE1, UE1 may configure its flexible symbol in symbol index 12 to match the communication modes of the flexible symbols in symbol indices 10 and 11 of UE2. Alternatively, UE1 may configure the flexible symbol as a gap symbol. For example, if one of the flexible symbols (in symbol index 10 or 11) of UE2 is used for UL transmissions while the other flexible symbol is used for DL transmissions, UE1 may configure the flexible symbol in symbol index 12 as a gap symbol.

Figure 10A:
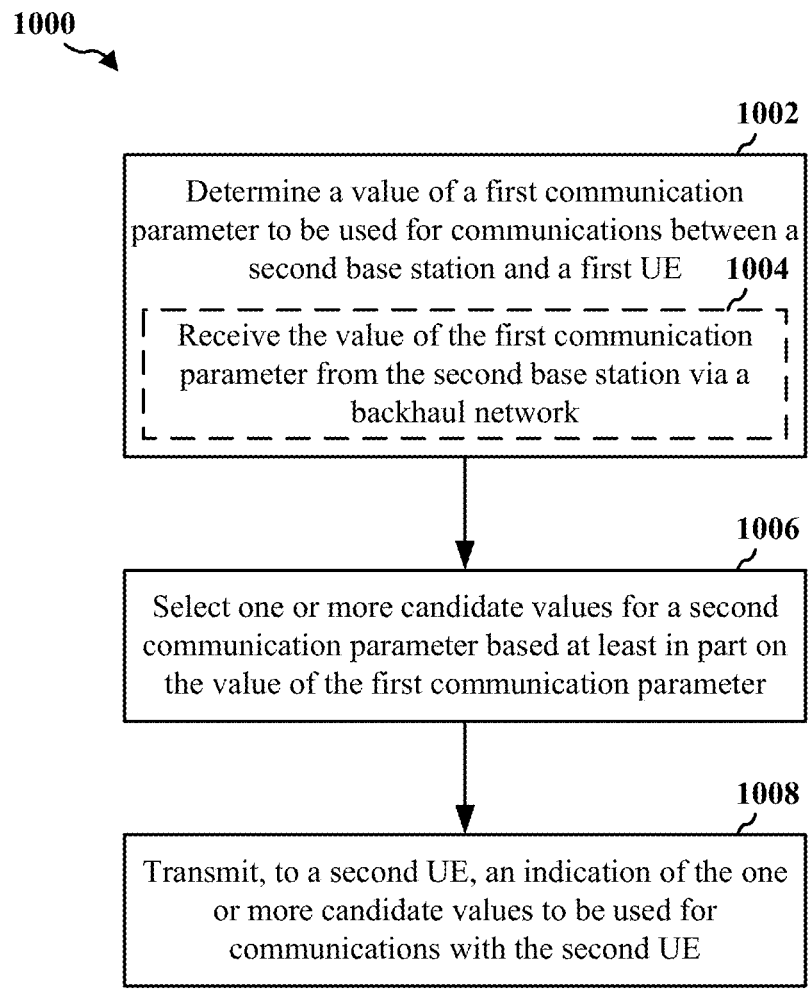
FIGS. 10A-10E are flowcharts of respective methods of wireless communication performed by a base station.

FIG. 10A is a flowchart 1000 of a method of wireless communication performed by a first base station. In some implementations, the method may be performed by the base station 102 of FIG. 1 or the apparatus 1300/1202' described below with respect to FIG. 13.

At 1002, the first base station determines a value of a first communication parameter to be used for communications between a second base station and a first UE. With reference for example to FIG. 6, the UE 606 may determine one or more preferred values for one or more of its communication parameters and transmits an indication of its preferred values 601 to the base station 602. For example, the preferred values may include one or more beam directions or slot formats that are suitable for communications between the UE 606 and the base station 602. In some aspects, the indication may include a listing of only the preferred values for the UE 606. In some other aspects, the indication may include a listing of values other than the preferred values for the UE 606 (depending on which listing is shorter).

In some implementations, at 1004, the first base station may receive the value of the first communication parameter from the second base station via a backhaul network. With reference for example to FIG. 6, the base stations 602 and 604 may exchange the preferred values 601 and 603 of their respective UEs 606 and 608 via one or more backhaul links. For example, the base station 602 may receive the preferred values 603 of the second UE 608 from the second base station 604.

At 1006, the first base station selects one or more candidate values for a second communication parameter based at least in part on the value of the first communication parameter. With reference to, for example FIG. 6, the base stations 602 and 604 may each determine one or more candidate values for the communication parameters based on the preferred values 601 and 603 for each of the UEs 606 and 608, respectively. More specifically, the base station 602 may determine one or more candidate values for the UE 606 based, at least in part, on the preferred values 603 for the second UE 608. In determining the candidate values, each of the base stations 602 and 604 may attempt to avoid or mitigate CLI, for example, by coordinating the beam directions or slot formats of the UEs 606 and 608

Finally, at 1008, the first base station transmits, to a second UE, an indication of the one or more candidate values to be used for communications with the second UE. With reference for example to FIG. 6, after determining the candidate values for the one or more communication parameters, the base stations 602 and 604 may transmit indications of the candidate values 607 and 609 to the UEs 606 and 608, respectively. In some aspects, the indication may include a listing of only the candidate values for the corresponding UE. In some other aspects, the indication may include a listing of values other than the candidate values for the corresponding UE (depending on which listing is shorter).

Figure 10B:
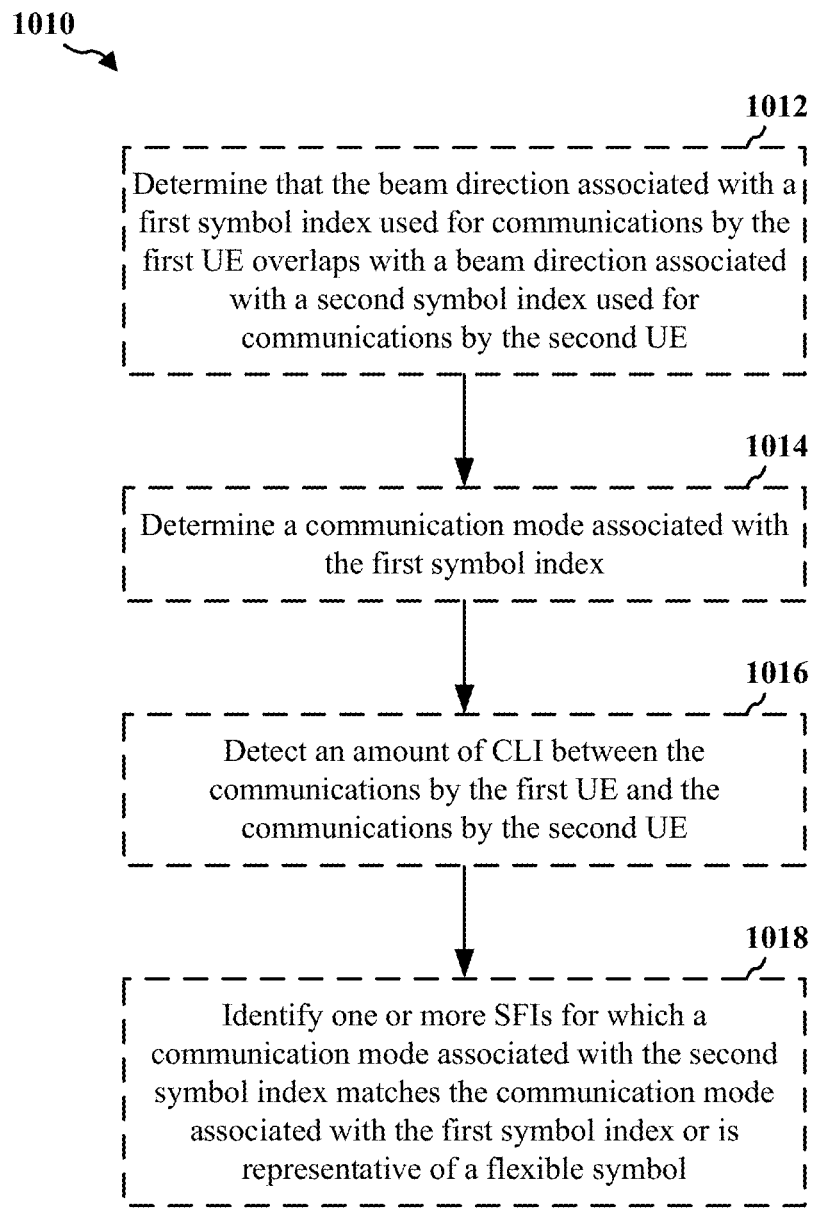

FIG. 10B is a flowchart 1010 of another method of wireless communication performed by a first base station. In some implementations, the method of FIG. 10B may be a more detailed implementation of the step of selecting one or more candidate values, at 1006, in FIG. 10A.

At 1012, the first base station determines that the beam direction associated with a first symbol index used for communications by the first UE overlaps with a beam direction associated with a second symbol index used for communications by the second UE. As described with respect to FIG. 4A, two or more beam directions may be determined to overlap if the CLI resulting from concurrent UL and DL transmissions exceeds an interference threshold (such as a threshold SINR).

At 1014, the first base station determines a communication mode associated with the first symbol index. As described with respect to FIG. 5A, each symbol index of a given slot may be associated with a communication mode representative of a downlink symbol ("D"), an uplink symbol ("U"), or a flexible symbol ("F") which can be used for DL or UL communications.

In some implementations, at 1016, the base station may detect an amount of CLI between the communications by the first UE and the communications by the second UE. For example, the CLI may be determined based on interference measurements performed by one or more base stations or reports by the UEs. In some implementations, UE1 and UE2 may determine what SCS to use based at least in part on an amount of CLI between the UEs. When the CLI is sufficiently high, it may be desirable to reduce the difference in SCS between UE1 and UE2, for example, to reduce the number of opportunities for CLI.

Finally, at 1018, the first base station identifies one or more SFIs for which a communication mode associated with the second symbol index matches the communication mode associated with the first symbol index or is representative of a flexible symbol. With reference for example to FIG. 6, the base stations 602 and 604 may attempt to coordinate slot formats between the UEs 606 and 608. For example, the base stations 602 and 604 may select one or more slot formats for each of the UEs 606 and 608 (among the preferred slot formats indicated by the UEs 606 and 608) in which the communication mode of the UE 606 is consistent with the communication mode of the second UE 608 in each symbol period of the given slot.

Figure 10C:
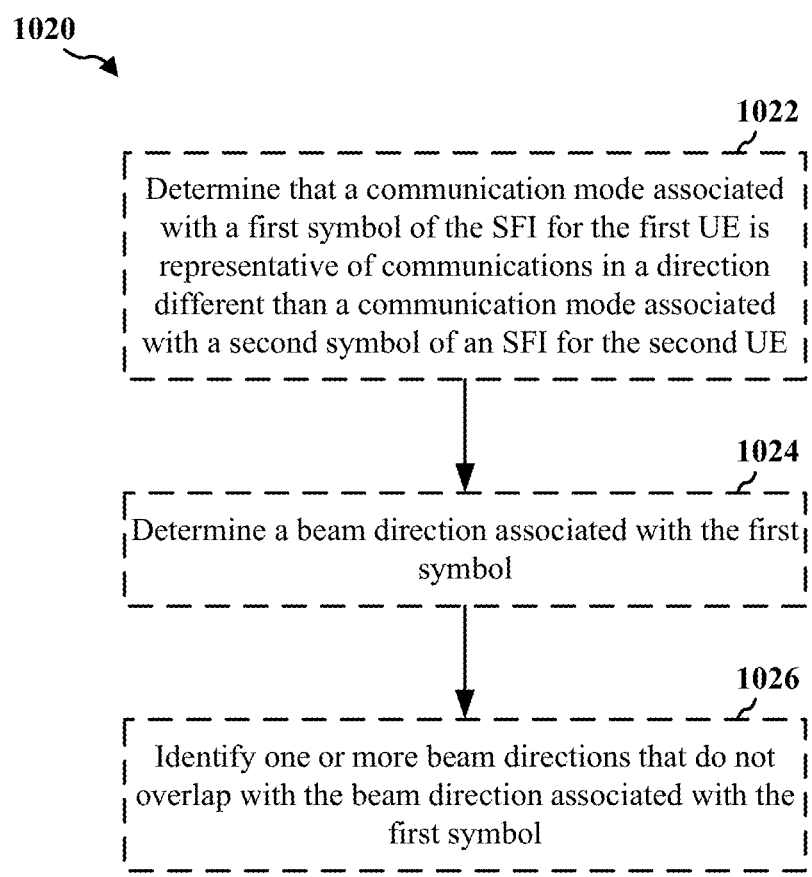

FIG. 10C is a flowchart 1020 of another method of wireless communication performed by a first base station. In some implementations, the method of FIG. 10C may be a more detailed implementation of the step of selecting one or more candidate values, at 1006, in FIG. 10A.

At 1022, the first base station determines that a communication mode associated with a first symbol of the SFI for the first UE is representative of communications in a direction different than a communication mode associated with a second symbol of an SFI for the second UE. As described with respect to FIG. 5A, a communication mode of the UE may be deemed "consistent" with a communication mode of the second UE if the corresponding symbols can be used for communications in the same direction (UL or DL).

At 1024, the first base station determines a beam direction associated with the first symbol. As described with respect to FIG. 4A, UEs operating in the UL mode use TX beamforming techniques to focus the energy of UL signals in the direction of a corresponding base station, whereas UEs operating in the DL mode use receive RX beamforming techniques to tune their receive antennas in the direction of the beams transmitted by a corresponding base station. The beam direction may correspond to one or more antenna sectors (of a phased array antenna).

Finally, at 1026, the first base station identifies one or more beam directions that do not overlap with the beam direction associated with the first symbol. With reference for example to FIG. 6, the base stations 602 and 604 may attempt to coordinate beam directions between the UEs 606 and 608. For example, the base stations 602 and 604 may select one or more beam directions for each of the UEs 606 and 608 (among the preferred beam directions indicated by the UEs 606 and 608) that do not overlap with one another. In some implementations, the beam selection may be optimized based on at least one of a resulting channel structure, data rate, diversity, power consumption, or heat dissipation.

Figure 10D:
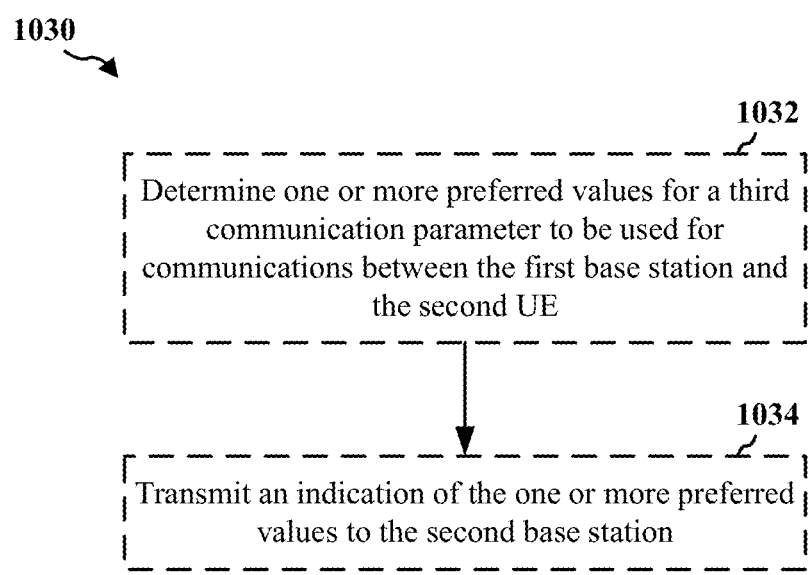

FIG. 10D is a flowchart 1030 of another method of wireless communication performed by a first base station. In some implementations, the method of FIG. 10D may be performed prior to the step of selecting one or more candidate values, at 1006, in FIG. 10A.

At 1032, the first base station determines one or more preferred values for a third communication parameter to be used for communications between the first base station and the second UE. With reference for example to FIG. 6, the UE 606 determines one or more preferred values for one or more of its communication parameters and transmits an indication of its preferred values 601 to the base station 602. For example, the preferred values may include one or more beam directions or slot formats that are suitable for communications between the UE 606 and the base station 602. The third communication parameter may also be a subcarrier spacing.

Finally, at 1034, the first base station transmits an indication of the one or more preferred values to the second base station. With reference for example to FIG. 6, the base stations 602 and 604 may exchange the preferred values 601 and 603 of their respective UEs 606 and 608 via one or more backhaul links. For example, the base station 602 may receive the preferred values 603 of the second UE 608 from the second base station 604. Similarly, the second base station 604 may receive the preferred values 601 of the UE 606 from the base station 602.

Figure 10E:
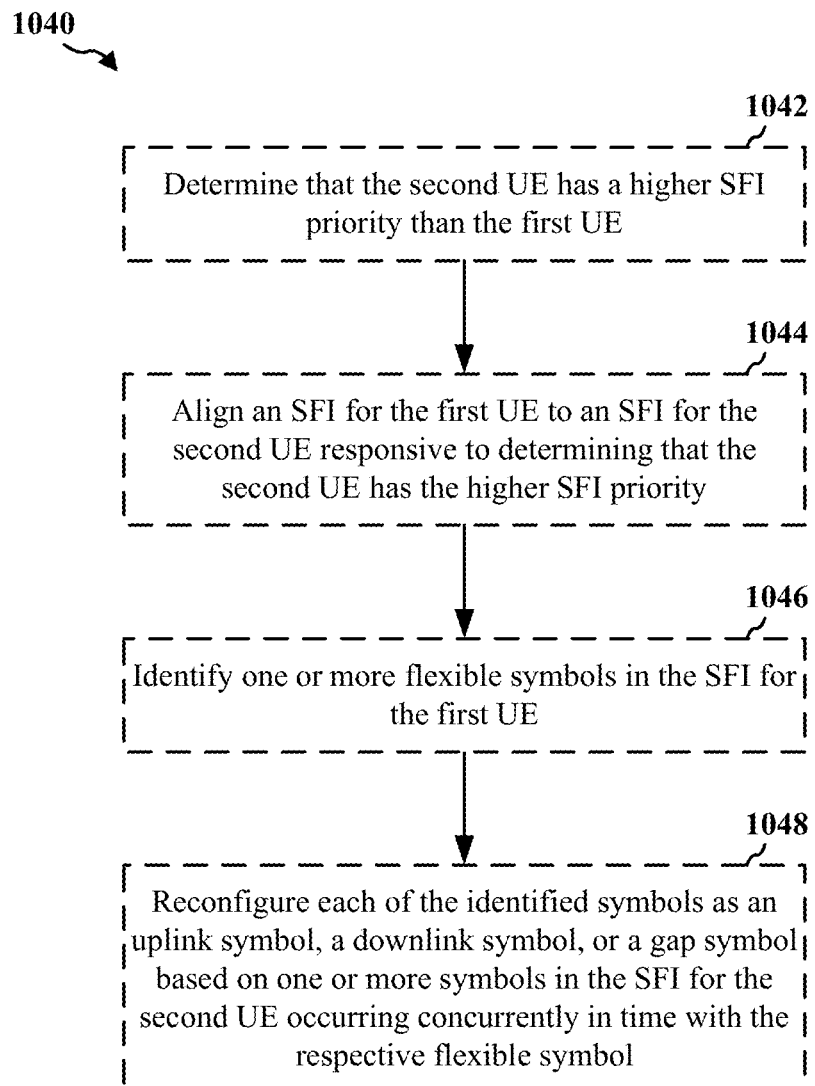

FIG. 10E is a flowchart 1040 of another method of wireless communication performed by a first base station. In some implementations, the method of FIG. 10E may be a more detailed implementation of the step of selecting one or more candidate values, at 1006, in FIG. 10A.

At 1042, the first base station determines that the second UE has a higher SFI priority than the first UE. As described with respect to FIG. 9, each UE may indicate its respective priority (using an SFI priority indication bit or field) during the process of coordinating one or more communication parameters. For example, each UE may provide its SFI priority indication to its respective base station or directly to the other UE along with its preferred values for one or more communication parameters.

At 1044, the first base station aligns an SFI for the first UE to an SFI for the second UE responsive to determining that the second UE has the higher SFI priority. For example, in some instances, both UEs may select slot formats containing one or more flexible symbols. In some implementations, the flexible symbols of a lower-priority UE may be aligned with the flexible symbols of a higher-priority UE.

At 1046, the first base station identifies one or more flexible symbols in the SFI for the first UE. With reference for example to FIG. 9, the slot format for UE1 includes a flexible symbol in symbol index 12 and the slot formats for UE2 include flexible symbols in symbol index 12 of slot 0 and symbol indices 10-12 of slot 1. More specifically, the flexible symbol in symbol index 12 of UE1 coincides with flexible symbols in symbol indices 10 and 11 of UE2.

Finally, at 1048, the first base station reconfigures each of the identified symbols as an uplink symbol, a downlink symbol, or a gap symbol based on one or more symbols in the SFI for the second UE occurring concurrently in time with the respective flexible symbol. For example, if UE1 has a higher priority than UE2, UE2 may configure one or both of its flexible symbols in symbol indices 10 and 11 to match the communication mode of the flexible symbol in symbol index 12 of UE1. On the hand, if UE2 has a higher priority than UE1, UE1 may configure its flexible symbol in symbol index 12 to match the communication modes of the flexible symbols in symbol indices 10 and 11 of UE2.

Figure 11:
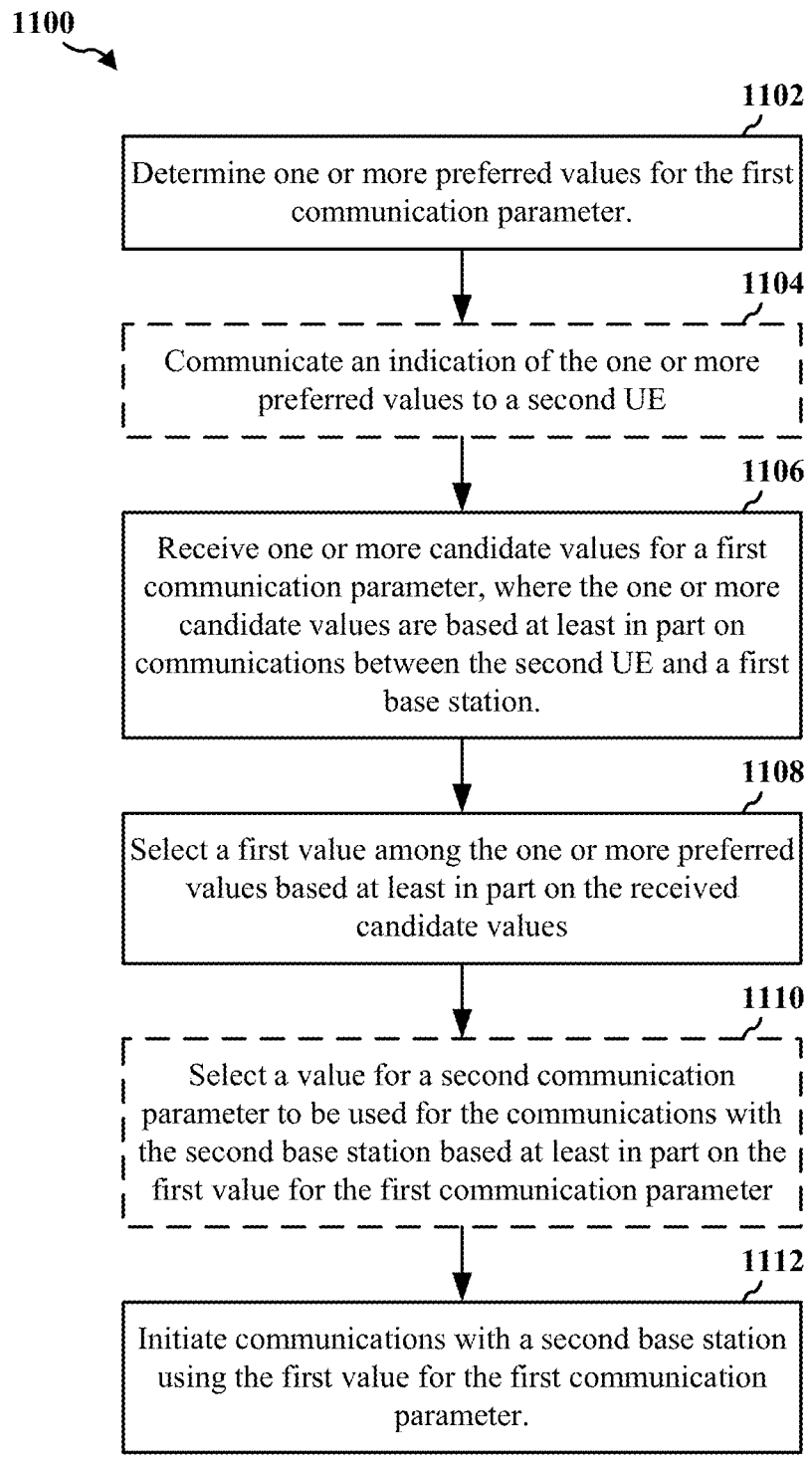
FIG. 11 is a flowchart of a method of wireless communication performed by a UE.

FIG. 11 is a flowchart 1100 of a method of wireless communication performed by a first UE. In some implementations, the method may be performed by the UE 104 of FIG. 1 or the apparatus 1500/1402' described below with respect to FIG. 15.

At 1102, the first UE determines one or more preferred values for the first communication parameter. With reference for example to FIG. 6, the UE 606 determines one or more preferred values for one or more of its communication parameters and transmits an indication of its preferred values 601 to the base station 602. For example, the preferred values may include one or more beam directions or slot formats that are suitable for communications between the UE 606 and the base station 602.

In some implementations, at 1104, the first UE may communicate an indication of the one or more preferred values to a second UE. In some aspects, as described with respect to FIG. 6, the UE 606 may transmit the indication to base station 602. The base station 602 forwards the indication to a second base station 604, via a backhaul network (including one or more backhaul links), and the second base station 604 subsequently transmits the indication to the second UE 608. In some other aspects, as described with respect to FIG. 7, the UE 706 may directly transmit the indication to the second UE 708 via one or more sidelink channels.

At 1106, the first UE receives one or more candidate values for a first communication parameter, where the one or more candidate values are based at least in part on communications between the second UE and a first base station. In some implementations, as described with respect to FIG. 7, the UE 706 may receive the candidate values directly from the second UE 708, where the candidate values include one or more preferred values of the second UE 708. In some implementations, as described with respect to FIG. 6, the UE 606 may receive the candidate values from the base station 602, where the candidate values include a subset of preferred values of the UE 606. Still further, in some implementations, as described with respect to FIG. 8, the UE 806 may receive the candidate values from the base station 802, where the candidate values include one or more pre-coordinated (or predetermined) values.

At 1108, the first UE selects a first value among the one or more preferred values based at least in part on the received candidate values. In some implementations, as described with respect to FIGS. 6 and 8, the UE 606/806 may select the first value from the listing of candidate values provided by the base station 602/802. In some other implementations, as described with respect to FIG. 7, the UE 706 selects a value for each of the communication parameters to be used for subsequent communications with the base station 702 based, at least in part, on the preferred values 703 of the second UE 708. More specifically, the UE 706 may coordinate its preferred values with the preferred values of the second UE 708.

In some implementations, at 1110, the first UE may select a value for a second communication parameter to be used for the communications with the second base station based at least in part on the first value for the first communication parameter. As described with respect to FIGS. 6 and 7, the selection of the value for the second communication parameter may be limited (or restricted) based on the selected value for the communication parameter (to avoid or mitigate CLI). In some aspects, the UE 706 may determine which of its preferred beam directions can be paired with the preferred beam directions of the second UE 708 such that the beams do not overlap. In some other aspects, the UE 706 may determine which of its preferred slot formats can be paired with the preferred slot formats of the second UE 708 such that the communication mode of the UE 706 is consistent with the communication mode of the second UE 708 in each symbol period of the given slot.

Finally, at 1112, the first UE initiates communications with a second base station using the first value for the first communication parameter. As described with respect to FIGS. 6-8, the UE 606/706/806 may use the selected beam direction or slot format to transmit UL data or receive DL data from the base station 602/702/802.

Figure 12:
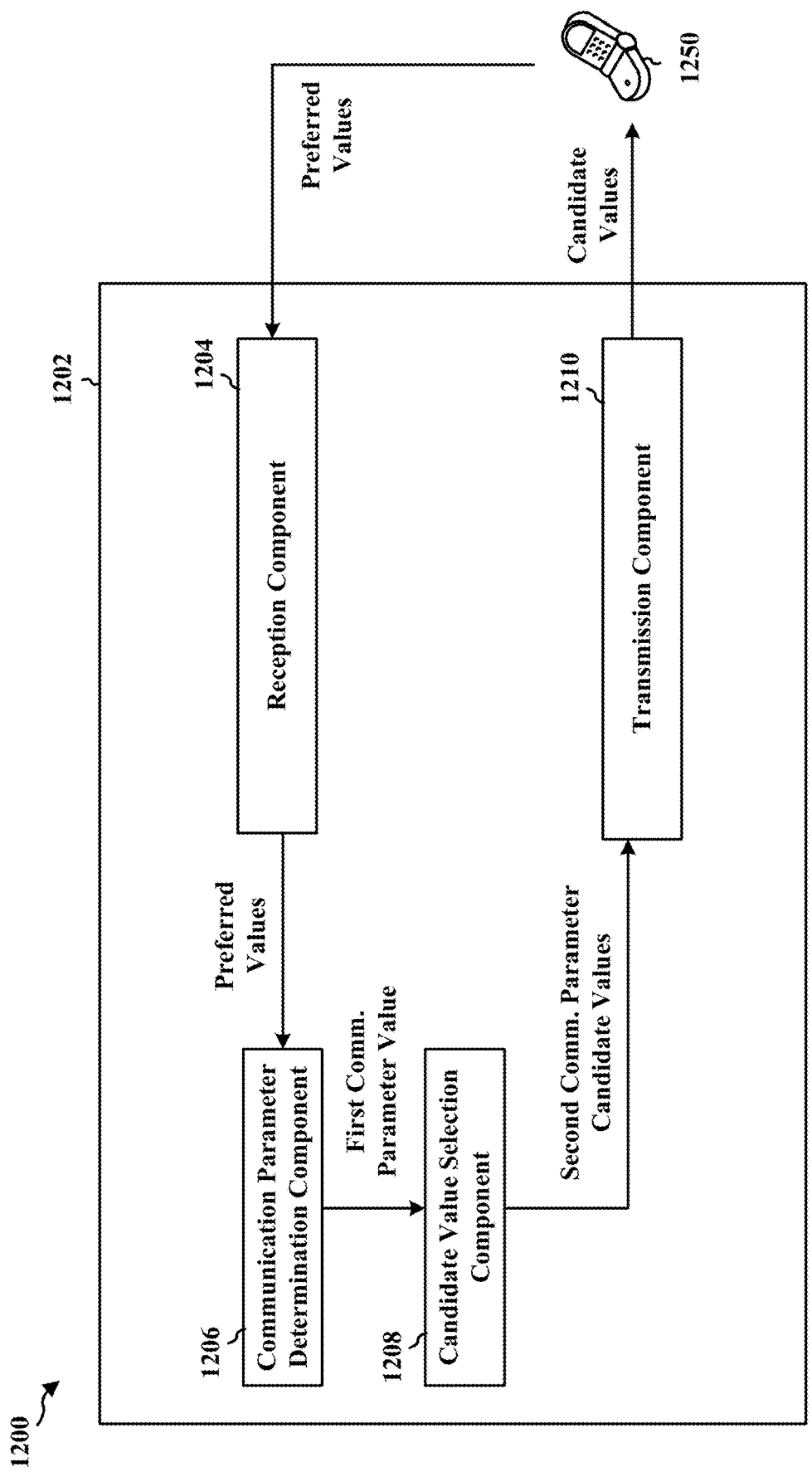
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus 1202 may be a base station (such as the base station 310 of FIG. 3). The apparatus includes a reception component 1204 configured to receive preferred values for one or more communication parameters of a UE 1250, a communication parameter determination component 1206 configured to determine a value of a first communication parameter to be used for communications between another base station and another UE, a candidate value selection component 1208 configured to select one or more candidate values for a second communication parameter based at least in part on the value of the first communication parameter, and a transmission component 1210 configured to transmit, to the UE 1250, an indication of the one or more candidate values to be used for communications between the UE 1250 and the apparatus 1202.

The apparatus may include additional components that perform each of the blocks of the algorithm in the aforementioned flowcharts of FIGS. 10A-10E. As such, each block in the aforementioned flowcharts of FIGS. 10A-10E may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
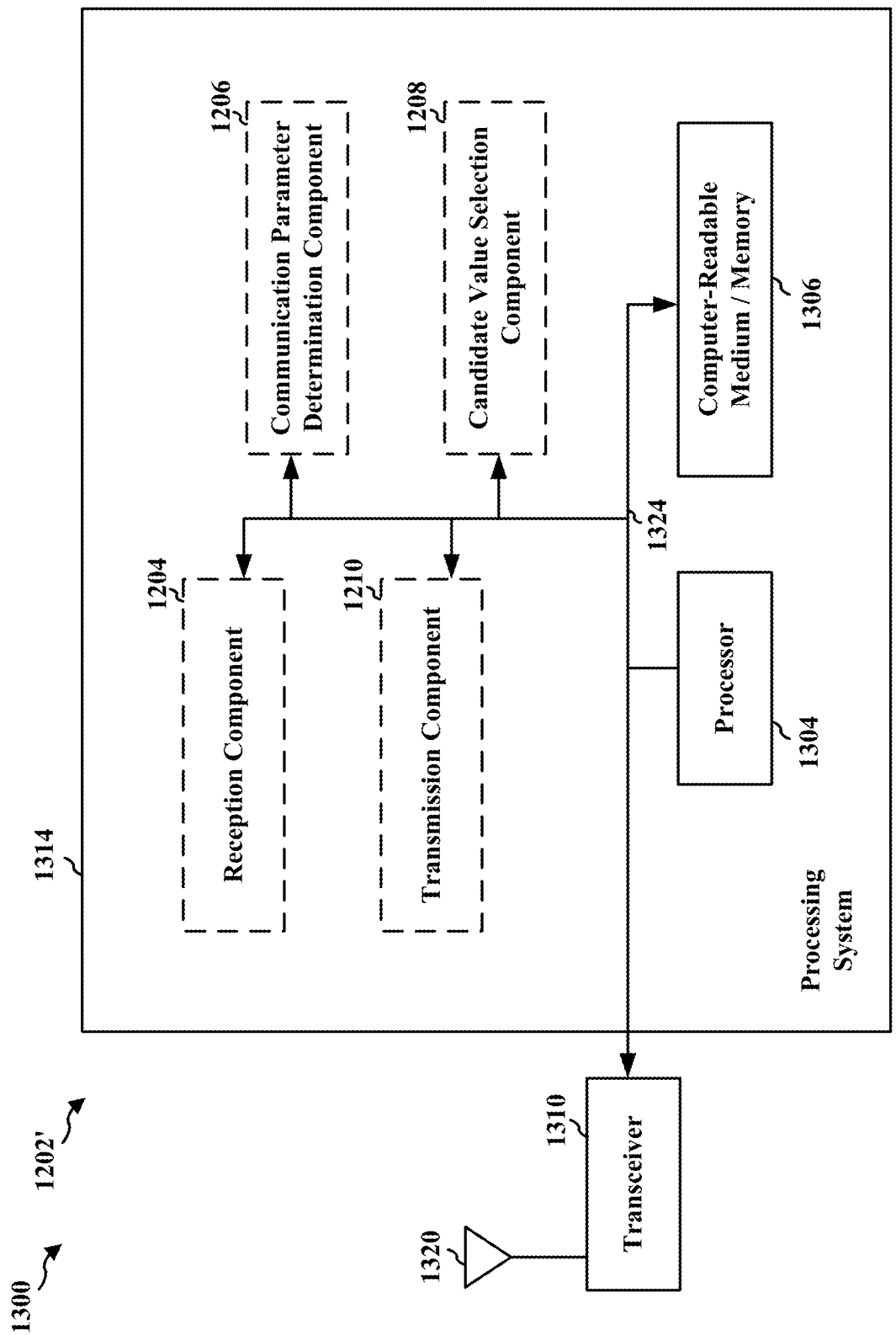
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208 and 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for performing any of the operations described above with reference to FIGS. 10A-10E. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
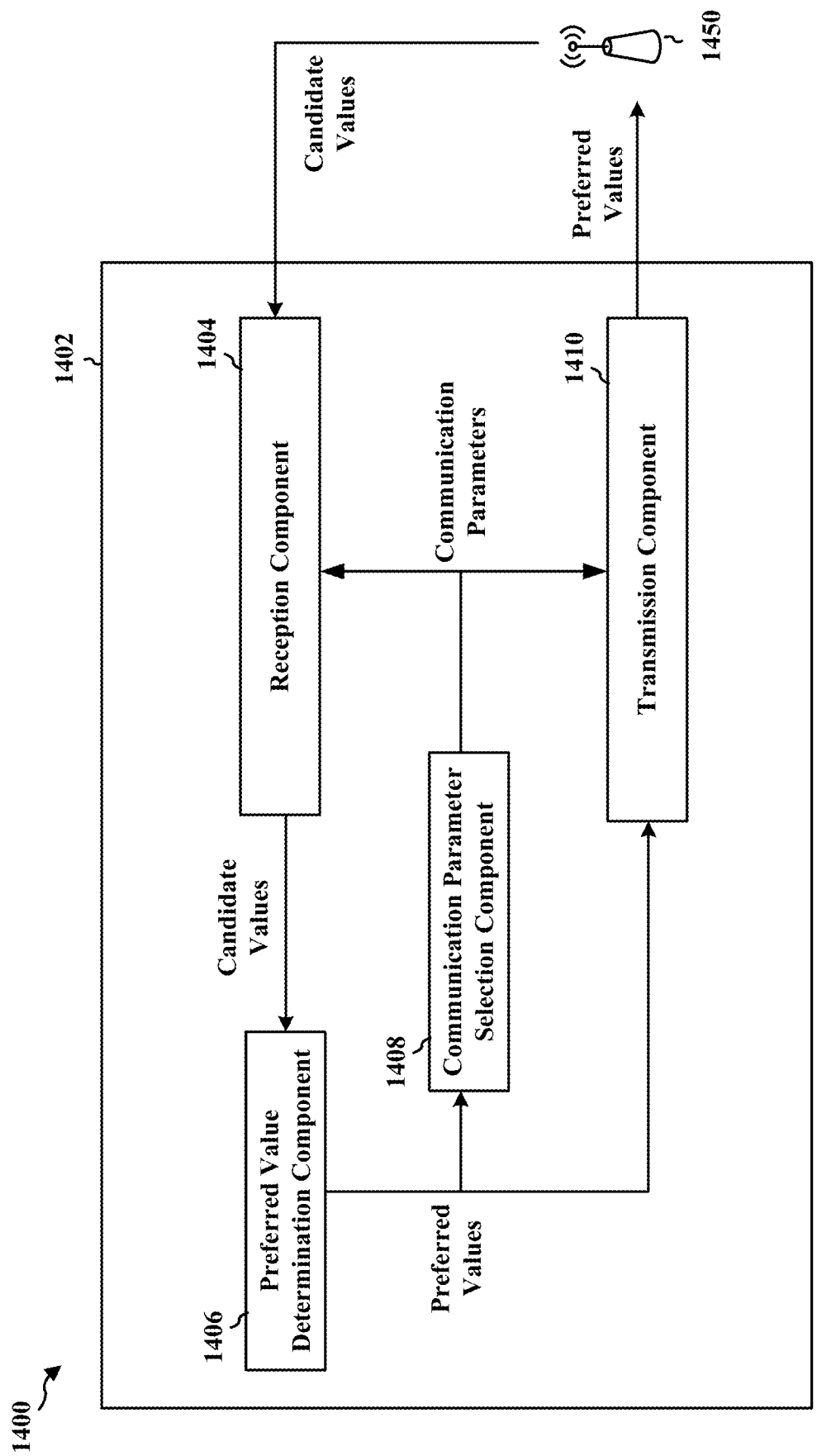
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus 1402 may be a UE (such as the UE 104 of FIG. 1). The apparatus includes a reception component 1404 configured to receive candidate values for one or more communication parameters from a base station 1450 or another UE (not shown), where the candidate values are based at least in part on communications between another UE and another base station, a preferred value determination component 1406 configured to determine one or more preferred values for a first communication parameter, a communication parameter selection component 1408 configured to select a first value among the one or more preferred values based at least in part on the received candidate values, and a transmission component 1410 configured to initiating communications with the base station 1450 using the first value for the first communication parameter.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
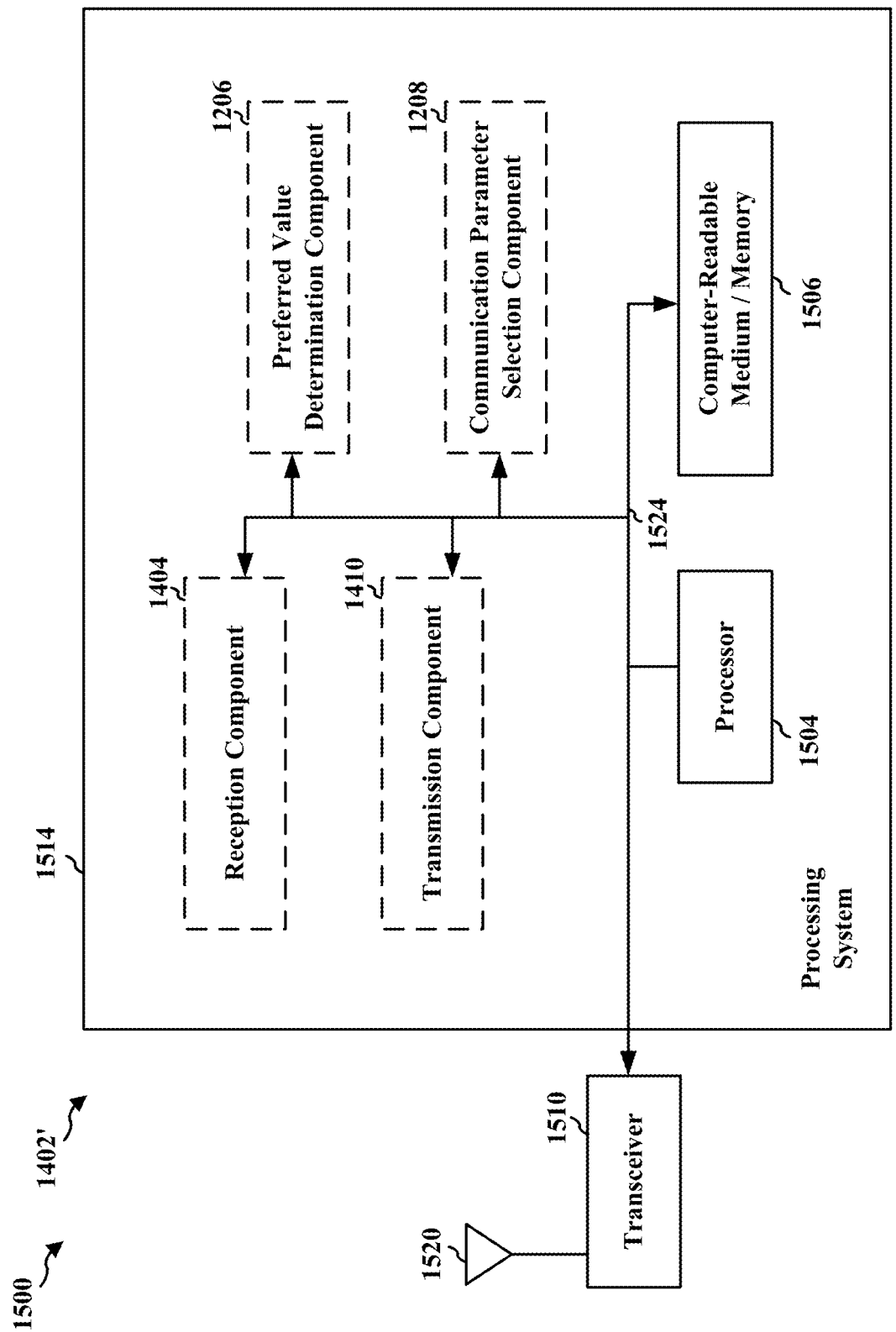
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, and 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, and 1410. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for performing any of the operations described above with reference to FIG. 11. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects of the present disclosure relate to avoiding or mitigating CLI in dynamic TDD communications. In some implementations, UEs may coordinate one or more communication parameters to reduce or eliminate CLI in inter-UE coexistence. Example communication parameters may include, but are not limited to, beam direction and slot format. By coordinating their communication parameters, each UE may select a combination of beam directions and slot formats that avoids or minimizes CLI with neighboring UEs. For example, if a first UE uses a beam direction that overlaps with a beam direction used by a second UE during a given time period (or symbol duration), the first and second UEs may select coordinated slot formats such that one UE is not configured for UL transmissions while the other UE is configured for DL transmissions during the given time period. On the other hand, if a first UE is configured for UL transmissions while a second UE is configured for DL transmissions during a given time period (or symbol duration), the first and second UEs may select coordinated beam directions that do not overlap with one another during the given time period. Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Implementation examples are described in the following numbered clauses.

1. A method of wireless communication performed by a first user equipment (UE), the method comprising:
    determining one or more preferred values for a first communication parameter comprising one of a first beam direction or a first slot format index (SFI);
    receiving one or more candidate values for the first communication parameter, the one or more candidate values being based at least in part on communications between a second UE and a first base station;
    selecting a first value among the one or more preferred values based at least in part on the received one or more candidate values; and
    initiating communications with a second base station using the first value for the first communication parameter.
2. The method of clause 1, wherein the one or more candidate values are received from the second base station or the first base station.
3. The method of clause 1 or 2, wherein the receiving comprises:
    transmitting an indication of the one or more preferred values to the second base station, the one or more candidate values being received responsive to the indication.
4. The method of clause 3, wherein the indication includes a listing of the one or more preferred values.
5. The method of clauses 4 or 5, wherein the indication includes a listing of values for the first communication parameter other than the one or more preferred values.
6. The method of any of the preceding clauses, wherein the one or more candidate values are received from the second UE via a sidelink channel.

7. The method of clause 6, further comprising transmitting an indication of the one or more preferred values to the second UE via the sidelink channel.
8. The method of clause 7, wherein the indication includes a listing of the one or more preferred values.
9. The method of clause 7 or 8, wherein the indication includes a listing of values for the first communication parameter other than the one or more preferred values.
10. The method of any of the preceding clauses, further comprising selecting a value for a second communication parameter to be used for the communications with the second base station based at least in part on the first value for the first communication parameter, the second communication parameter comprising one of a second beam direction or a second slot format index (SFI).
11. A method of wireless communication performed by a first base station, the method comprising:
    determining a value of a first communication parameter to be used for communications between a second base station and a first user equipment (UE), the first communication parameter comprising a first beam direction;
    selecting one or more candidate values for a second communication parameter based at least in part on the value of the first communication parameter, the second communication parameter comprising a slot format index (SFI); and
    transmitting, to a second UE, an indication of the one or more candidate values to be used for communications between the second UE and the first base station.
12. The method of clause 11, wherein the selecting comprises:
    determining that the first beam direction associated with a first symbol index used for communications by the first UE overlaps with a second beam direction associated with a second symbol index used for communications by the second UE, the first symbol index and the second symbol index occurring concurrently in time;
    determining a first communication mode associated with the first symbol index, the first communication mode being representative of an uplink symbol, a downlink symbol, or a flexible symbol; and
    identifying one or more SFIs for which a second communication mode associated with the second symbol index matches the first communication mode associated with the first symbol index or is representative of a flexible symbol.
13. The method of any of the preceding clauses, wherein the indication includes a listing of only the identified SFIs.
14. The method of any of the preceding clauses, wherein the indication includes a listing of SFIs other than the identified SFIs.
15. The method of clause 12, wherein the first symbol index is associated with a first SCS (subcarrier spacing) different than a second SCS associated with the second symbol index.
16. The method of clause 15, wherein the selecting comprises detecting an amount of cross-link interference (CLI) between the communications by the first UE and the communications by the second UE, the one or more candidate values being selected based on the amount of CLI, the first SCS associated with the first symbol index and the second SCS associated with the second symbol index.
17. The method of clauses 15 or 16, wherein the first symbol index is associated with a higher SCS than the second symbol index, and wherein a communication mode associated with a third symbol index for each of the identified SFIs matches the communication mode associated with the first symbol index or is representative of the flexible symbol, the third symbol index occurring concurrently in time with the first symbol index.
18. A method of wireless communication performed by a first base station, the method comprising:
    determining a value of a first communication parameter to be used for communications between a second base station and a first user equipment (UE), the first communication parameter comprising a first SFI (slot format index);
    selecting one or more candidate values for a second communication parameter based at least in part on the value of the first communication parameter, the second communication parameter comprising a first beam direction; and
    transmitting, to a second UE, a first indication of the one or more candidate values to be used for communications between the second UE and the first base station.
19. The method of clause 18, wherein the selecting comprises:
    determining that a first communication mode associated with a first symbol index of the first SFI for the first UE is representative of communications in a direction different than a second communication mode associated with a second symbol index of a second SFI for the second UE, the first symbol index and the second symbol index occurring concurrently in time;
    determining the first beam direction associated with the first symbol index; and
    identifying one or more second beam directions that do not overlap with the first beam direction associated with the first symbol index.
20. The method of clause 19, wherein the one or more candidate values includes each of the identified second beam directions.
21. The method of clauses 19 or 20, wherein the one or more candidate values includes only one of the identified second beam directions, the one identified second beam direction being optimized for concurrent communications by the first UE and the second UE.
22. The method of clause 21, wherein optimization is based on at least one of a resulting channel structure, data rate, diversity, power consumption, or heat dissipation.
23. The method of any of the preceding clauses, wherein the first SFI for the first UE is associated with a different SCS than the second SFI for the second UE.
24. The method of any of the preceding clauses, wherein the determining comprises receiving the value of the first communication parameter from the second base station via a backhaul network.
25. The method of any of the preceding clauses, wherein the selecting comprises determining one or more preferred values for a third communication parameter to be used for communications between the first base station and the second UE, the one or more candidate values being selected based at least in part on the value of the first communication parameter and the one or more preferred values for the third communication parameter.

26. The method of clause 25, further comprising transmitting a second indication of the one or more preferred values for the third communication parameter to the second base station.

27. The method of any of the preceding clauses, further comprising:
   determining that the second UE has a higher slot format index (SFI) priority than the first UE; and
   aligning the first SFI for the first UE to an SFI for the second UE responsive to determining that the second UE has the higher SFI priority.

28. The method of clause 27, wherein the aligning comprises:
   identifying one or more flexible symbols in the SFI for the first UE; and
   reconfiguring each of the identified symbols as an uplink symbol, a downlink symbol, or a gap symbol based on one or more symbols in the SFI for the second UE occurring concurrently in time with the respective flexible symbol.

29. The method of clause 28, wherein one or more of the identified symbols are reconfigured to match the one or more symbols in the SFI for the second UE.

30. The method of any of the preceding clauses, wherein the communications between the first base station and the first UE occur on a different frequency band than the communications between the second base station and the second UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a first user equipment (UE), the method comprising:
   determining one or more preferred values for a first communication parameter comprising a first slot format index (SFI);
   receiving one or more candidate values for the first communication parameter, the one or more candidate values being based at least in part on communications between a second UE and a first base station;
   selecting a first value among the one or more preferred values based at least in part on the received one or more candidate values; and
   initiating communications with a second base station using the first value for the first communication parameter.

2. The method of claim 1, wherein the one or more candidate values are received from the second base station or the first base station and the first communication parameter further comprises a first beam direction.

3. The method of claim 2, wherein the receiving comprises:
   transmitting an indication of the one or more preferred values to the second base station, the one or more candidate values being received responsive to the indication.

4. The method of claim 3, wherein the indication includes a listing of the one or more preferred values.

5. The method of claim 3, wherein the indication includes a listing of values for the first communication parameter other than the one or more preferred values.

6. The method of claim 1, wherein the one or more candidate values are received from the second UE via a sidelink channel and the first communication parameter further comprises a first beam direction.

7. The method of claim 6, further comprising transmitting an indication of the one or more preferred values to the second UE via the sidelink channel.

8. The method of claim 7, wherein the indication includes a listing of the one or more preferred values.

9. The method of claim 8, wherein the indication includes a listing of values for the first communication parameter other than the one or more preferred values.

10. The method of claim 1, further comprising selecting a value for a second communication parameter to be used for the communications with the second base station based at least in part on the first value for the first communication parameter, the first communication parameter further comprising a first beam direction, the second communication parameter comprising one of a second beam direction or a second slot format index (SFI).

11. A method of wireless communication performed by a first base station, the method comprising:
   determining a value of a first communication parameter to be used for communications between a second base station and a first user equipment (UE), the first communication parameter comprising a first beam direction;
   selecting one or more candidate values for a second communication parameter based at least in part on the value of the first communication parameter, the second communication parameter comprising a slot format index (SFI); and transmitting, to a second UE, an indication of the one or more candidate values to be used for communications between the second UE and the first base station.

12. The method of claim 11, wherein the selecting comprises:
determining that the first beam direction associated with a first symbol index used for communications by the first UE overlaps with a second beam direction associated with a second symbol index used for communications by the second UE, the first symbol index and the second symbol index occurring concurrently in time;
determining a first communication mode associated with the first symbol index, the first communication mode being representative of an uplink symbol, a downlink symbol, or a flexible symbol; and
identifying one or more SFIs for which a second communication mode associated with the second symbol index matches the first communication mode associated with the first symbol index or is representative of a flexible symbol.

13. The method of claim 12, wherein the indication includes a listing of only the identified SFIs.

14. The method of claim 12, wherein the indication includes a listing of SFIs other than the identified SFIs.

15. The method of claim 12, wherein the first symbol index is associated with a first SCS (subcarrier spacing) different than a second SCS associated with the second symbol index.

16. The method of claim 15, wherein the selecting comprises detecting an amount of cross-link interference (CLI) between the communications by the first UE and the communications by the second UE, the one or more candidate values being selected based on the amount of CLI, the first SCS associated with the first symbol index and the second SCS associated with the second symbol index.

17. The method of claim 15, wherein the first symbol index is associated with a higher SCS than the second symbol index, and wherein a communication mode associated with a third symbol index for each of the identified SFIs matches the first communication mode associated with the first symbol index or is representative of the flexible symbol, the third symbol index occurring concurrently in time with the first symbol index.

18. A method of wireless communication performed by a first base station, the method comprising:
determining a value of a first communication parameter to be used for communications between a second base station and a first user equipment (UE), the first communication parameter comprising a first SFI (slot format index);
selecting one or more candidate values for a second communication parameter based at least in part on the value of the first communication parameter, the second communication parameter comprising a first beam direction; and
transmitting, to a second UE, a first indication of the one or more candidate values to be used for communications between the second UE and the first base station.

19. The method of claim 18, wherein the selecting comprises:
determining that a first communication mode associated with a first symbol index of the first SFI for the first UE is representative of communications in a direction different than a second communication mode associated with a second symbol index of a second SFI for the second UE, the first symbol index and the second symbol index occurring concurrently in time;
determining the first beam direction associated with the first symbol index; and
identifying one or more second beam directions that do not overlap with the first beam direction associated with the first symbol index.

20. The method of claim 19, wherein the one or more candidate values includes each of the identified second beam directions.

21. The method of claim 19, wherein the one or more candidate values includes only one of the identified second beam directions, the one identified second beam direction being optimized for concurrent communications by the first UE and the second UE.

22. The method of claim 21, wherein optimization is based on at least one of a resulting channel structure, data rate, diversity, power consumption, or heat dissipation.

23. The method of claim 21, wherein the first SFI for the first UE is associated with a different SCS (subcarrier spacing) than the second SFI for the second UE.

24. The method of claim 18, wherein the determining comprises receiving the value of the first communication parameter from the second base station via a backhaul network.

25. The method of claim 18, wherein the selecting comprises determining one or more preferred values for a third communication parameter to be used for communications between the first base station and the second UE, the one or more candidate values being selected based at least in part on the value of the first communication parameter and the one or more preferred values for the third communication parameter.

26. The method of claim 25, further comprising transmitting a second indication of the one or more preferred values for the third communication parameter to the second base station.

27. The method of claim 18, further comprising:
determining that the second UE has a higher slot format index (SFI) priority than the first UE; and
aligning the first SFI for the first UE to an SFI for the second UE responsive to determining that the second UE has the higher SFI priority.

28. The method of claim 27, wherein the aligning comprises:
identifying one or more flexible symbols in the first SFI for the first UE; and
reconfiguring each of the identified symbols as an uplink symbol, a downlink symbol, or a gap symbol based on one or more symbols in the SFI for the second UE occurring concurrently in time with the respective flexible symbol.

29. The method of claim 28, wherein one or more of the identified symbols are reconfigured to match the one or more symbols in the SFI for the second UE.

30. The method of claim 18, wherein the communications between the first base station and the second UE occur on a different frequency band than the communications between the second base station and the first UE.

* * * * *